Jan. 27, 1959 C. C. CROW ET AL 2,871,301

AUTOMATIC TELEPHONE SYSTEM

Filed July 13, 1954 9 Sheets-Sheet 1

INVENTORS.
CLARENCE C. CROW
JAMES G. BONNAR
BY
Brown, Jackson, Boettcher & Dienner ATTYS.

Jan. 27, 1959 C. C. CROW ET AL 2,871,301

AUTOMATIC TELEPHONE SYSTEM

Filed July 13, 1954 9 Sheets-Sheet 2

INVENTORS.
CLARENCE C. CROW
JAMES G. BONNAR
BY
Brown, Jackson, Boettcher & Dienner
ATTYS.

AUTOMATIC TELEPHONE SYSTEM

Filed July 13, 1954

INVENTORS.
CLARENCE C. CROW
JAMES G. BONNAR
BY
Brown, Jackson, Boettcher
& Dienner
ATTYS.

AUTOMATIC TELEPHONE SYSTEM

TRUNK FINDER #1

145

INVENTORS.
CLARENCE C. CROW
JAMES G. BONNAR
BY Brown, Jackson, Boettcher & Dienner
ATTYS.

Jan. 27, 1959 C. C. CROW ET AL 2,871,301

AUTOMATIC TELEPHONE SYSTEM

Filed July 13, 1954 9 Sheets-Sheet 5

INVENTORS.
CLARENCE C. CROW
JAMES G. BONNAR

BY
Brown, Jackson, Boettcher & Dienner
ATTYS.

Jan. 27, 1959 C. C. CROW ET AL 2,871,301

AUTOMATIC TELEPHONE SYSTEM

Filed July 13, 1954 9 Sheets-Sheet 6

INVENTORS.
CLARENCE C. CROW
JAMES G. BONNAR

BY

Brown Jackson, Boettcher & Dienner

ATTYS.

AUTOMATIC TELEPHONE SYSTEM

Filed July 13, 1954 9 Sheets-Sheet 7

INVENTORS.
CLARENCE C. CROW
JAMES G. BONNAR
BY
Brown, Jackson, Boettcher & Dienner
ATTYS.

INVENTORS.
CLARENCE C. CROW
JAMES G. BONNAR
BY
Brown, Jackson, Boettcher
+ Dienner
ATTYS.

Jan. 27, 1959 C. C. CROW ET AL 2,871,301

AUTOMATIC TELEPHONE SYSTEM

Filed July 13, 1954 9 Sheets-Sheet 9

INVENTORS.
CLARENCE C. CROW
JAMES G. BONNAR
BY
Brown, Jackson, Boettcher & Dienner
ATTYS.

United States Patent Office 2,871,301
Patented Jan. 27, 1959

2,871,301

AUTOMATIC TELEPHONE SYSTEM

Clarence C. Crow and James G. Bonnar, Galion, Ohio, assignors to North Electric Company, a corporation of Ohio Application July 13, 1954, Serial No. 443,068

31 Claims. (Cl. 179—27)

Figure 1:
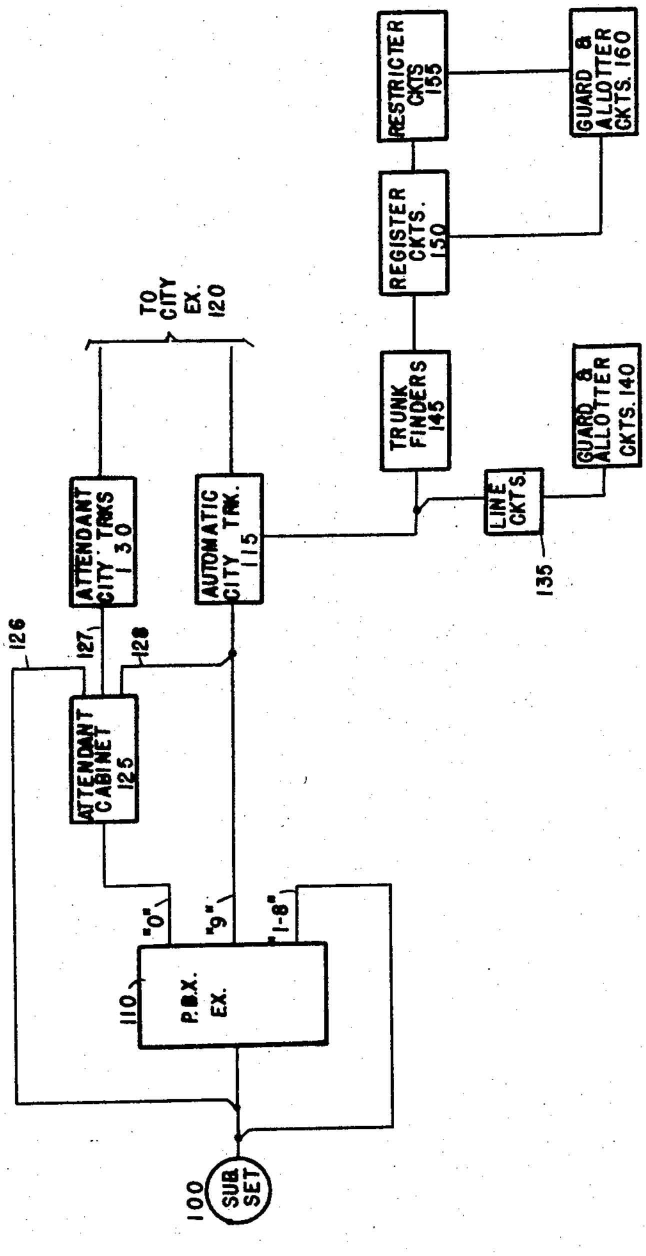

The present invention relates to an automatic telephone system, and particularly to a telephone system which includes a novel traffic restrictor arrangement.

The increasing use of automatic switching equipment in telephone exchanges makes possible the provision of a number of additional services for the subscribers, and particularly has made possible the direct extension of connections by the exchange subscribers to the subscribers of an increased number of exchanges. The provision of these additional services, however, invariably results in increased operating and maintenance costs, and it is necessary for the management to restrict the additional services to those subscribers who are willing to share the expense incurred in the provision thereof. The apparatus of the present invention is primarily adapted to restrictor means for limiting the direct calls of a certain group of subscribers to predetermined toll exchanges.

In brief detail, certain metropolitan areas having automatic toll ticketing facilities include toll ticketing trunk equipment which permits subscribers to dial certain outlying suburban areas directly. The equipment is thereupon operative to automatically make a record of the call for use in the subsequent billing of the calling subscriber. It is apparent that in organizations having a private branch exchange wherein the parties of the exchange have direct access to the city trunks, the parties will also be able to extend calls over the toll ticketing trunks, and the charge for such calls will, or course, be billed to the private branch exchange. In larger organizations, such procedure would be prohibitive from a cost standpoint. It is therefore frequently desirable in such arrangements to block calls to certain of these toll exchanges as attempted by the subscribers of a private branch exchange, and it is the specific object of this invention to provide restrictor apparatus which is operative to prevent the extension of calls by a certain group of subscribers to certain predetermined toll exchanges.

One known method of restricting calls outgoing from a private branch exchange comprises blocking of the incoming private branch exchange lines at the city exchange. In many instances, however, the management of the city exchange objects to such arrangement. In the present arrangement, novel means are provided at the private branch exchange which are operative to examine each call as initiated by a calling subscriber, and to block such calls as are being extended to certain predetermined exchanges and to permit extension of calls which are being extended to others of the exchanges.

The restrictor arrangement includes a register upon which are recorded the office exchange codes which may be accessible to the subscriber group, as well as those office codes which are to be restricted to the subscriber group. In metropolitan areas, the first three digits of the called number indicate the office exchange, and in such arrangements the restrictor is connected to examine the first three digits of each call as initiated and checks the three digits against the information which is contained on the associated register. If the comparison indicates the call is to be restricted, the restrictor operates to terminate extension of the call and to effect the release of the connection. If the comparison indicates that the call is to be permitted, the restrictor restores without further operation relative to the connection being extended.

The restrictor arrangement may, of course, be greatly modified to operate in a like manner following examination of a number of digits other than three. In certain examples set forth hereinafter, the restrictor apparatus will effect blocking of the equipment after examination of the first digit only, and in other cases, will effect blocking of the call after examination of the second digit. The manner in which the restrictor may be operative after the examination of any given number of digits will be apparent therefrom.

The novel restrictor apparatus will be especially suited for use with exchanges as nation wide dialling is afforded to an increased number of exchanges, the restrictor in such arrangement, of course, being modified to restrict certain subscribers from extending connections directly over the nation wide system.

The restrictor apparatus of the invention is particularly novel by reason of the limited amount of equipment which is utilized in providing such service. In one stage of the restrictor switching arrangement, a single digit effects selection of a first group of terminals and simultaneously effects selection of a smaller group of terminals from the first group selected by the same digit, whereby a proportionately smaller number of switching units are required in the call checking operation. Additionally, full advantage is made of common equipment wherever possible and the further consequent reduction of apparatus required is effected.

Figure 2:
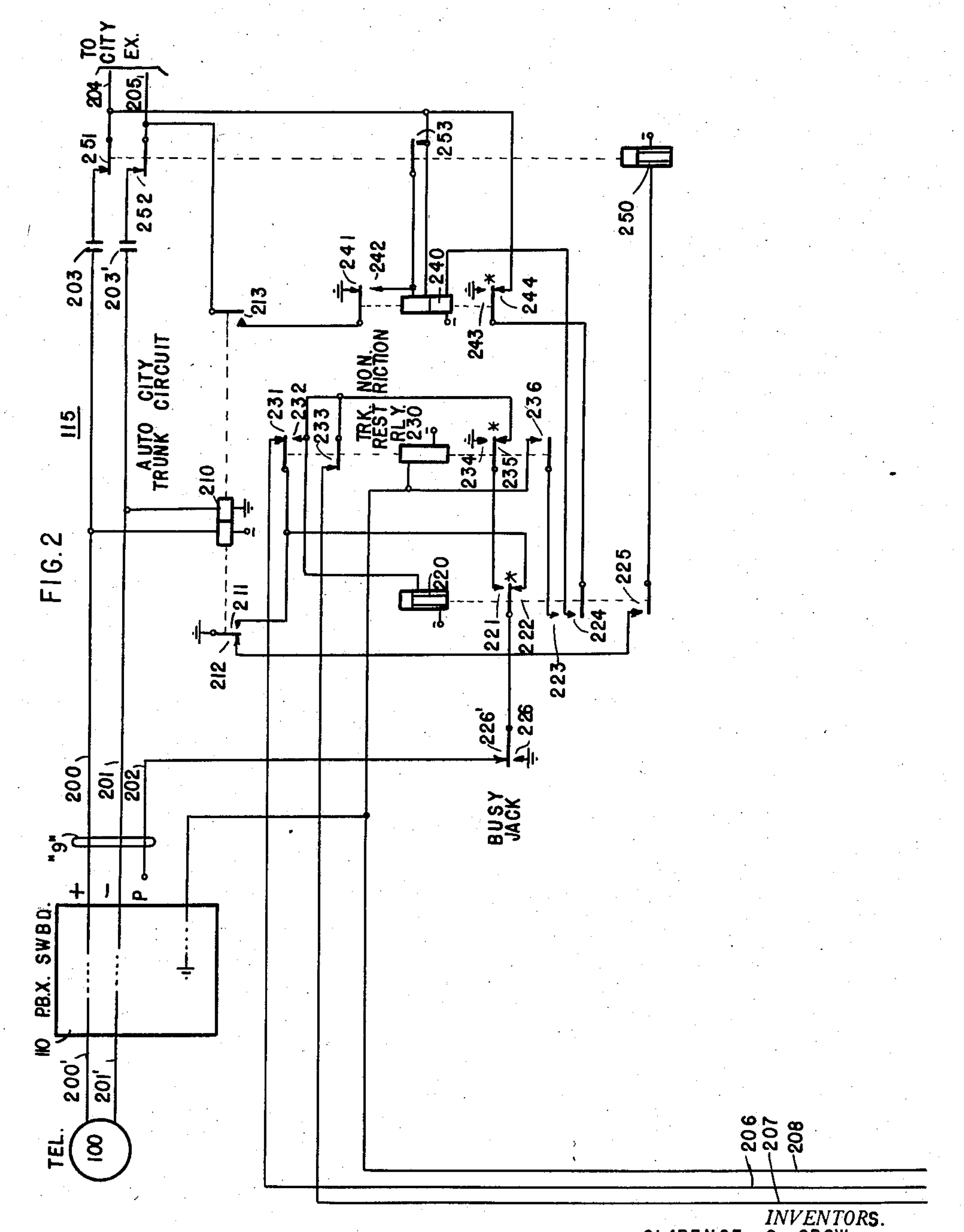
Figure 3:
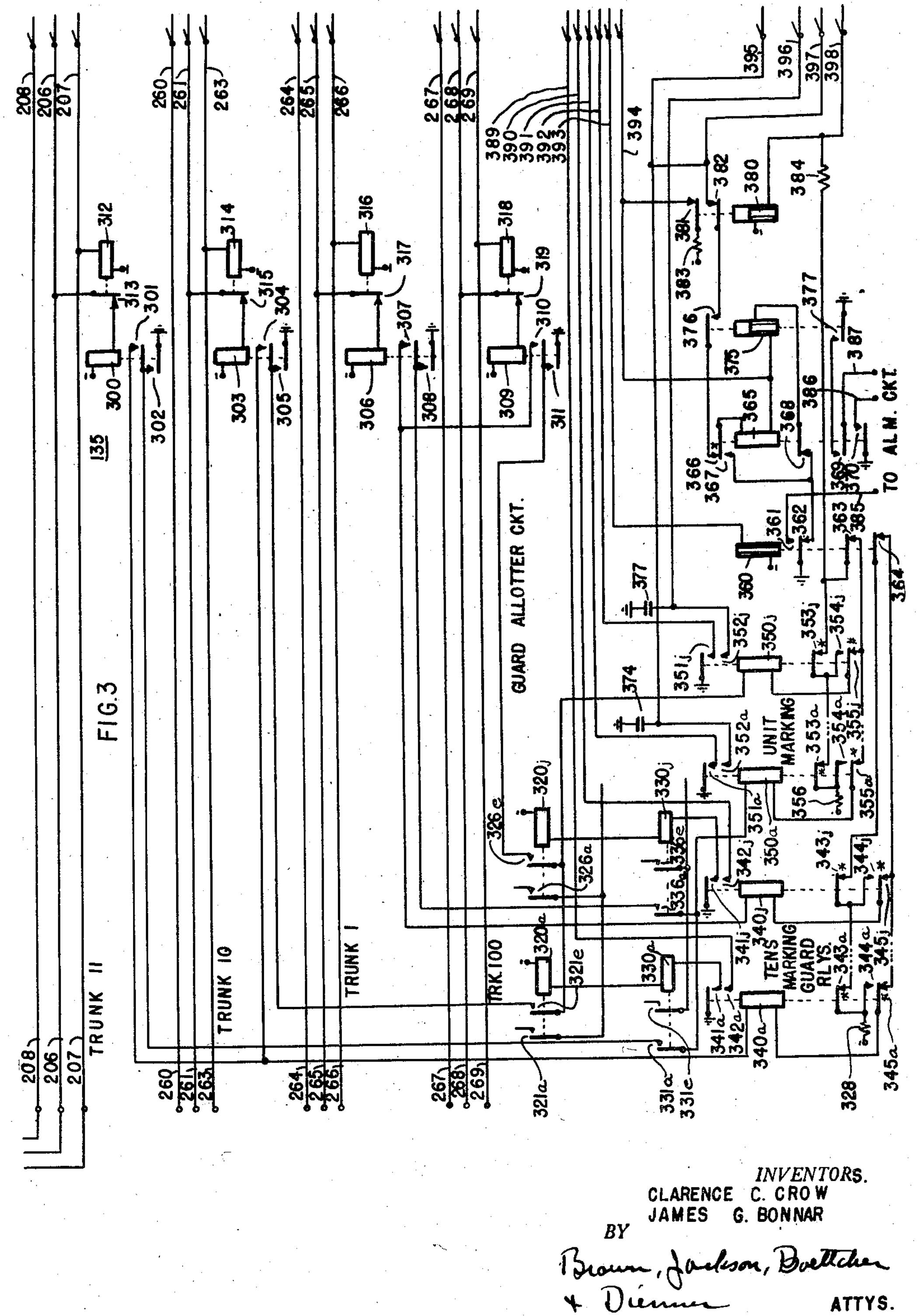
Figure 4:
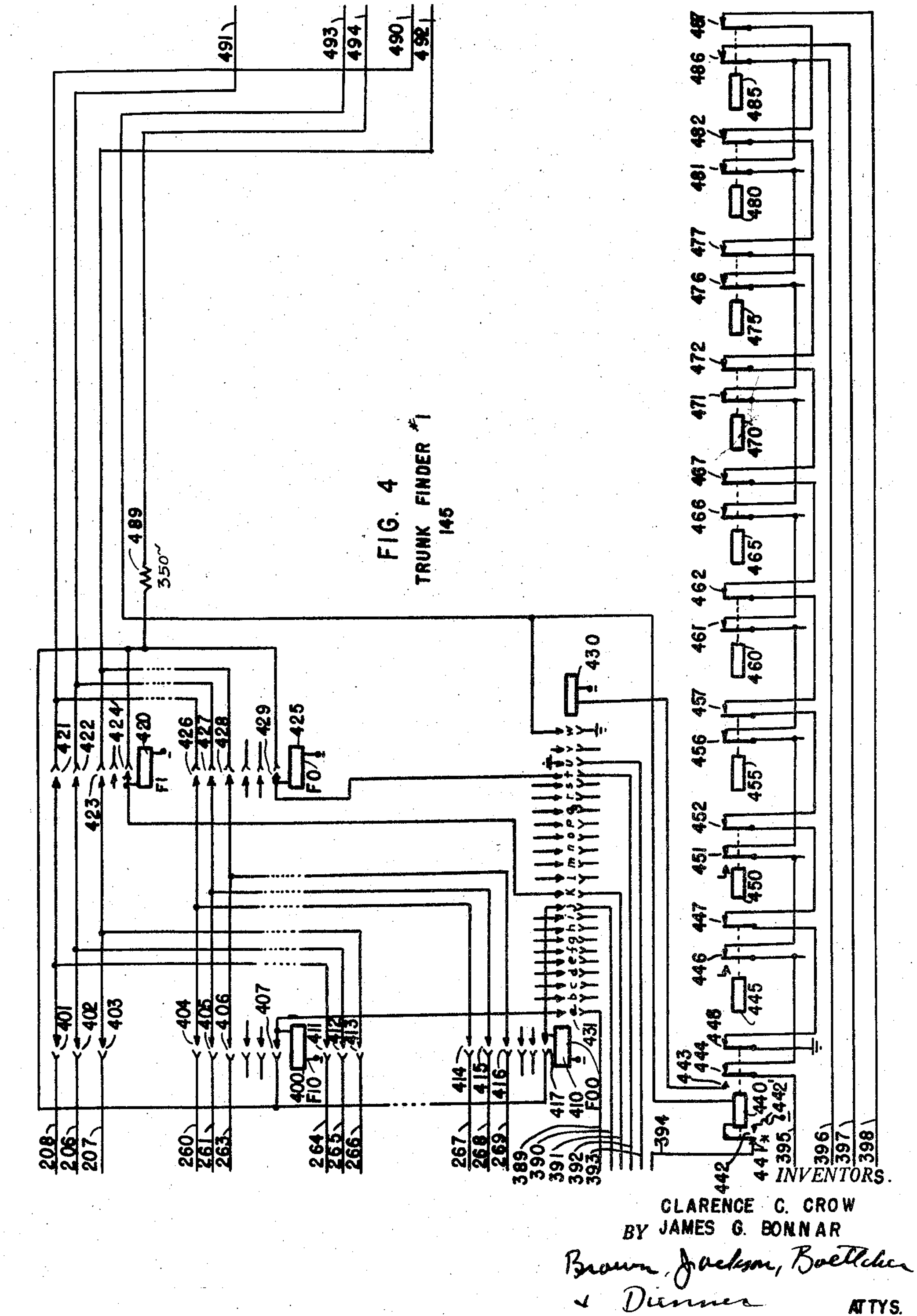
Figure 5:
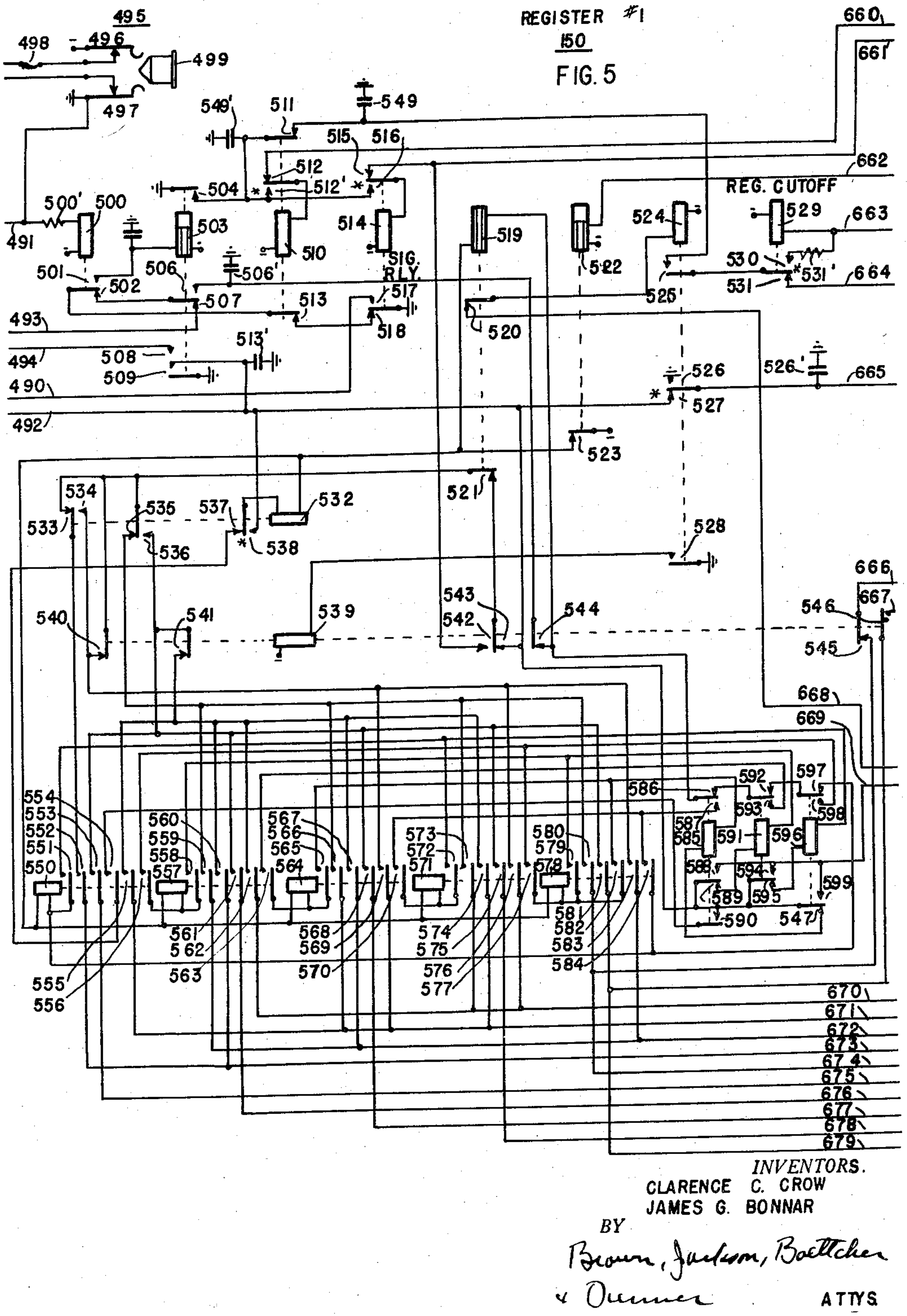
Figure 6:
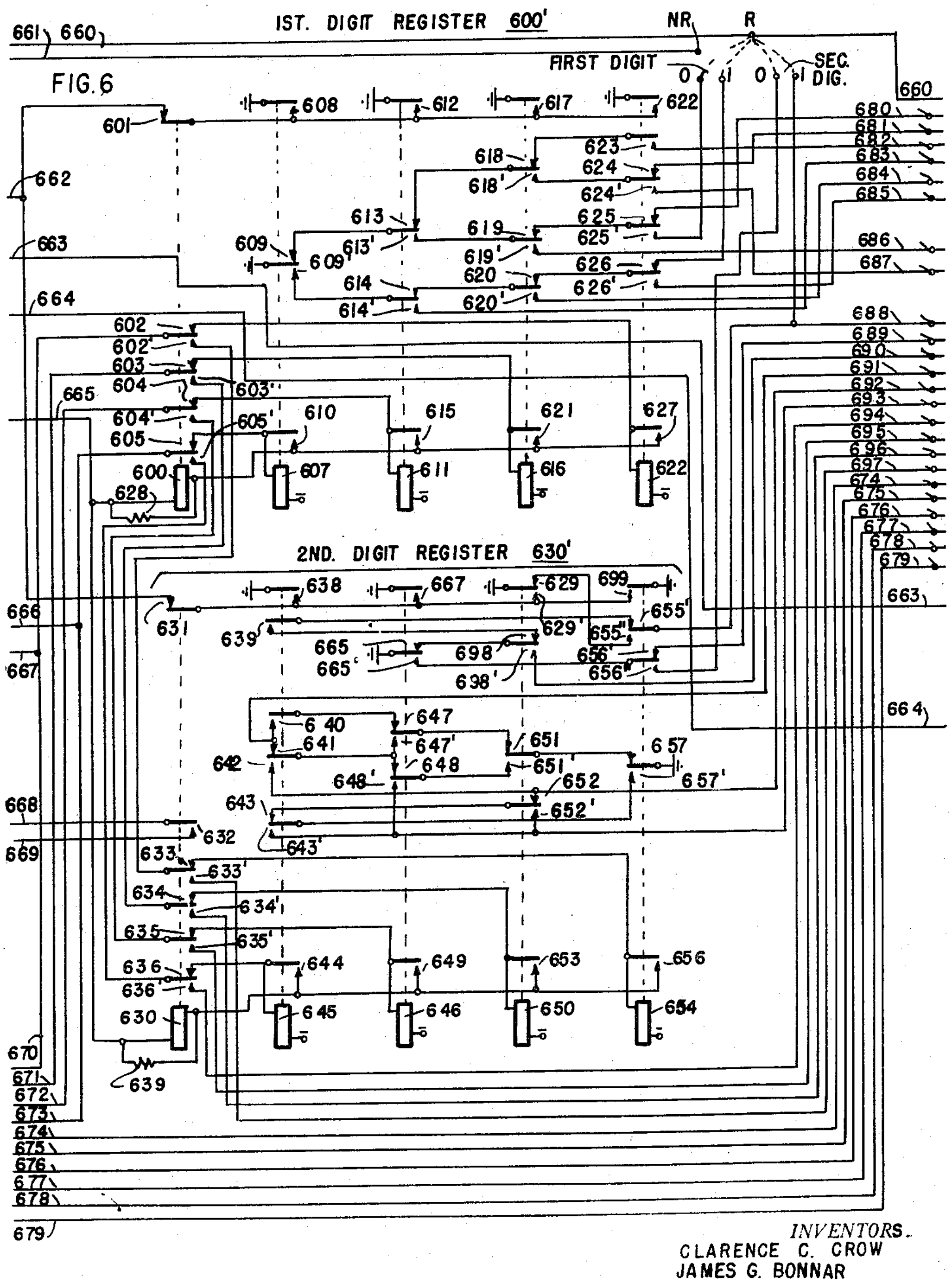
Figure 7:
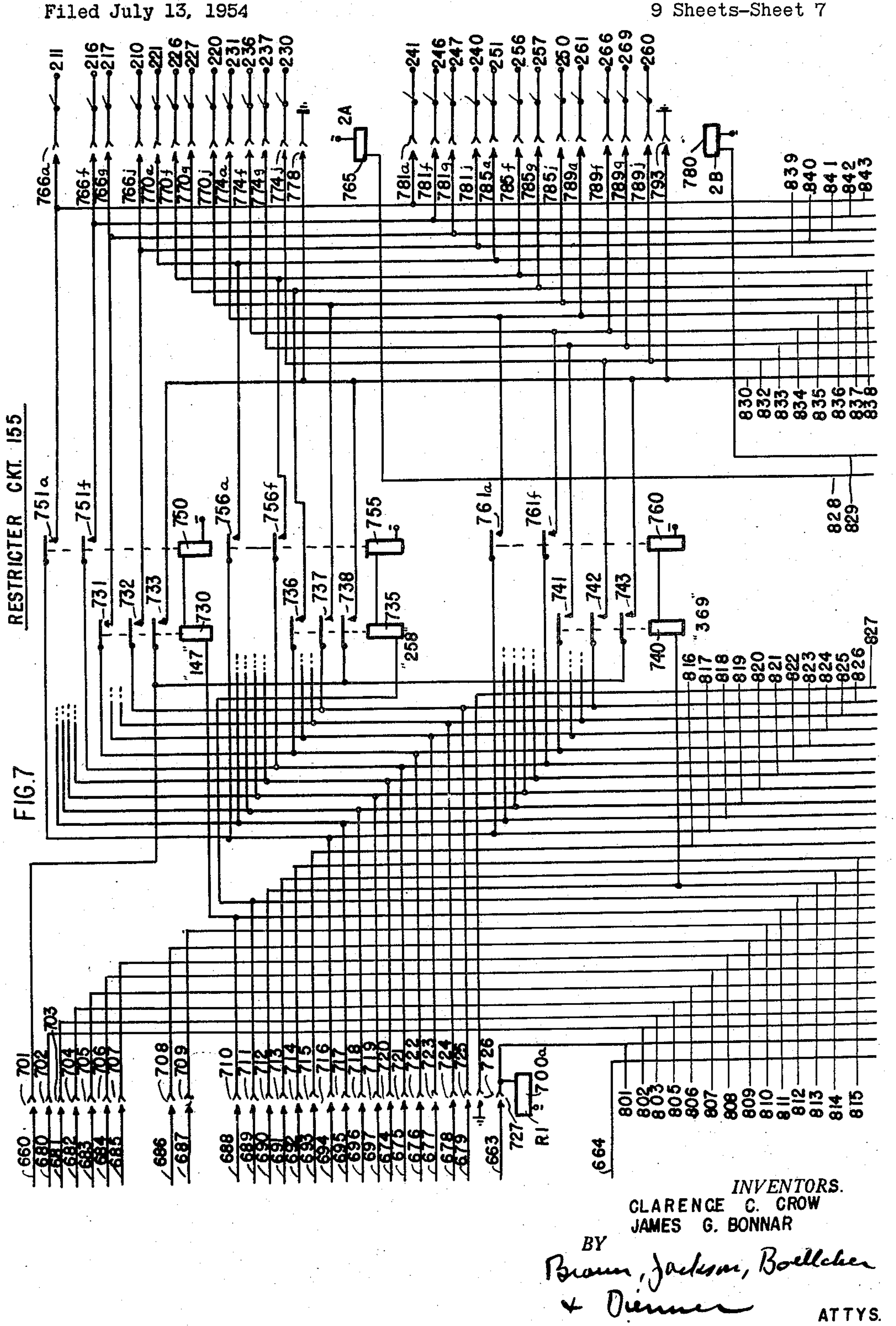
Figure 8:
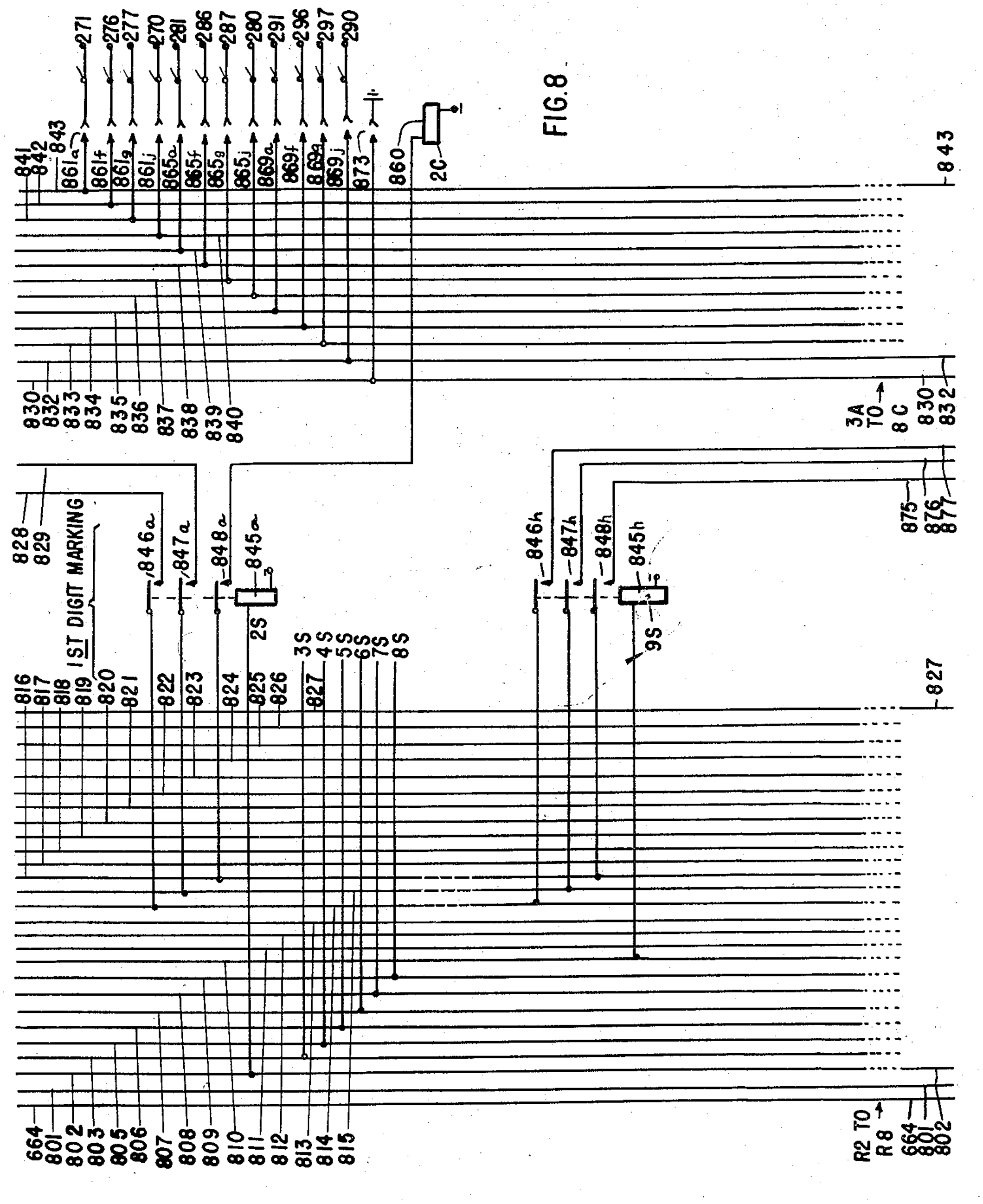
Figure 9:
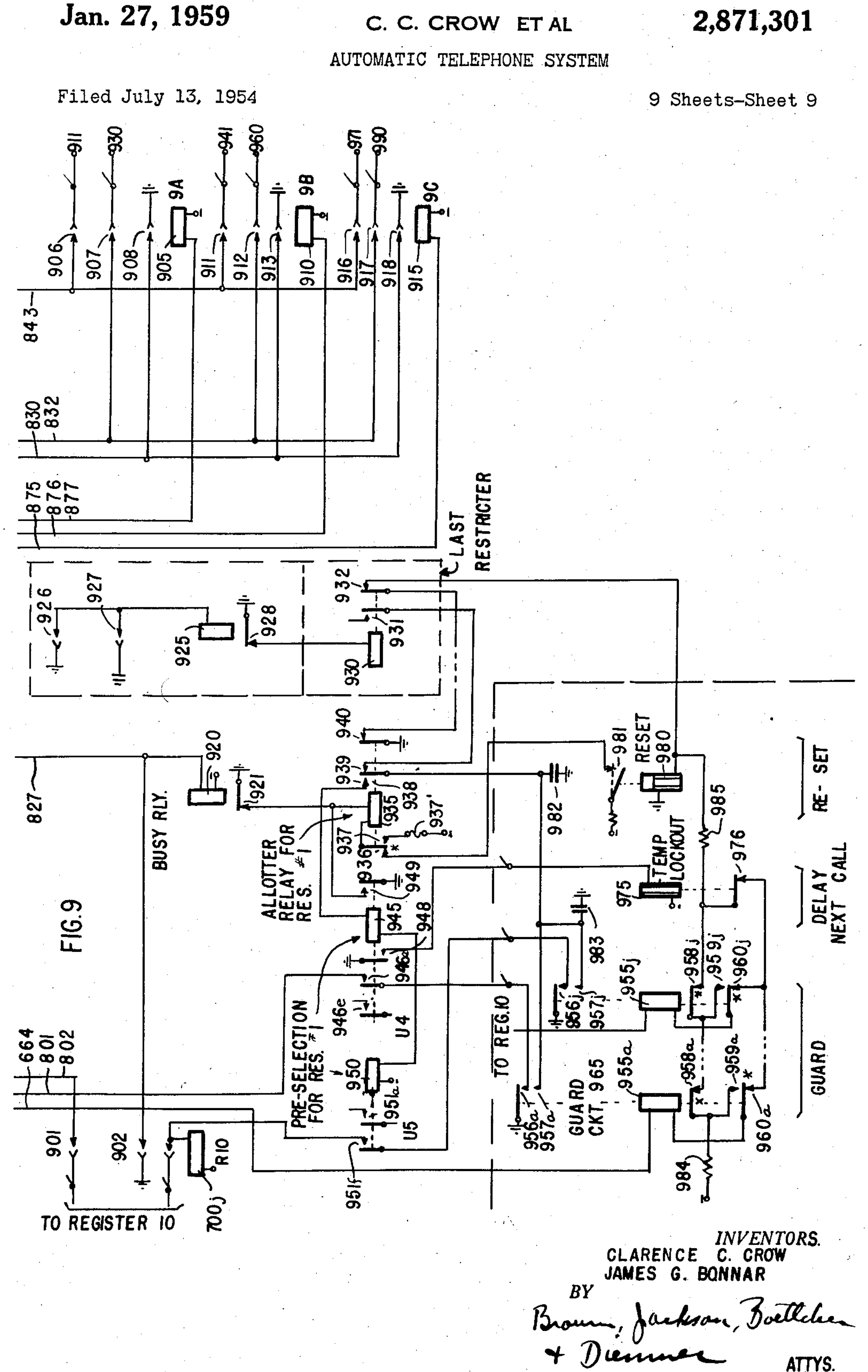

These and other features of the invention will become apparent with reference to the specification, claims and drawings which appear hereinafter, in which:

Figure 1 comprises a schematic block diagram setting forth the switching apparatus of the restrictor apparatus and its manner of connection at a P. B. X exchange;

Figure 2 illustrates a group of automatic city trunks associated with the P. B. X switchboard;

Figures 3 and 4 illustrate one of a group of trunk finders for connecting a P. B. X automatic city trunk to register equipment, and a guard circuit and allotter circuit associated therewith;

Figures 5 and 6 illustrate a register circuit tied back to back with the illustrated one of the trunk finders; and Figures 7, 8, and 9 illustrate one of a number of restrictors which are adapted to serve the registers multipled thereto including associate guard and allotter circuits for the restrictors.

*General arrangement of telephone system*

The general switching arrangement for the novel system is illustrated schematically in block form in Figure 1. As there shown, a private branch exchange 110 is adapted to serve a number of subscriber substations, one of which is illustrated generally at 100, and includes means for extending communicating connections between subscribers of the private branch exchange, as well as automatic city trunks 115 associated with the subscribers of an associated city exchange 120. In the illustrated arrangement, levels 1–8 of the P. B. X exchange have been assigned for use by the substation in establishing calls to other subscribers local to the P. B. X exchange; level 9 has been assigned for use in obtaining access to automatic city trunks 115; and level "0" has been assigned for use in reaching the attendant 125.

Calls may be extended from a subscriber in the private branch exchange 110 to another local subscriber in the conventional manner, levels 1–8 having been assigned to such function.

A subscriber in the private branch exchange 110 extends a connection to the attendant at attendant cabinet 125 by dialing the digit "0" in the conventional manner. As the attendant is reached, the call may be extended by the attendant alternatively over a path such as 127 to the attendant city trunks 130 associated with the city exchange 120; or over a path such as 128 to the automatic city trunks 115 which are also connected to the city exchange 120.

Calls incoming to the private branch exchange from parties in the city exchange 120 are extended over the attendant city trunks 130 to the attendant's position 125. The attendant in turn extends them over paths such as 126 to the desired party.

As indicated heretofore, the present invention includes a novel arrangement which allows subscribers of a P. B. X to extend connections to certain predetermined exchanges of the metropolitan system, and prevents access by subscribers of the P. B. X to other predetermined exchanges of the metropolitan system. If a P. B. X subscriber, such as illustrated subscriber 100, desires to extend a connection to a subscriber in any exchange of the metropolitan system, he dials the digit 9 followed by the number of the desired party, as for example:

City trunk seizing digit—9 Terminal called office designation—AN1 Called party number—2459

As the calling party dials the digit "9," an automatic city trunk circuit such as 115 is seized in the conventional manner, and the trunk in turn lands in the city exchange and seizes a city exchange link. Simultaneously, the automatic city trunk, such as illustrated unit 115, prepares the novel restrictor equipment for operation.

Briefly, the novel restrictor equipment of the invention includes a line circuit, such as illustrated line circuit 135, for each automatic city trunk, such as 115; a number of trunk finders, such as illustrated trunk finder 145, guard and allotter circuit 140 for allotting the trunks for use in a predetermined sequence and for guarding against seizure of more than one trunk at a time, a plurality of register circuits, such as illustrated register circuit 150, which are accessible to the automatic city trunks, such as 115, a number of restrictor circuits, such as illustrated circuit 155 which is accessible to the register circuit 150, and a guard and allotter circuit 160 for allotting the restrictors for use by the register in a predetermined sequence.

As the automatic city trunk, such as 115, is seized by a calling subscriber, it is operative to energize its associated line circuit 135, which in cooperation with the guard and allotter circuit 140 effects seizure of an idle one of the trunk finders 145 which finds the calling trunk, and extends same into an associated register circuit, such as the illustrated register circuit 150.

As the calling party dials the first three digits of the called party number (AN1 in the present example), the impulses representing the digits are transmitted by the seized automatic city trunk 115 to the city exchange 120, and are also registered in the seized register circuit 150.

Register circuit 150 is operative in response to the three digits received to register same on associated register sets, and as the third digit is registered the register seizes an idle restrictor circuit, such as 155. Each restrictor circuit has access to a number of terminals which is commensurate with the theoretical possible number of automatic exchanges in the system. Each terminal is associated with a predetermined exchange, and is marked in a particular fashion which is dependent upon whether the exchange is to be restricted or nonrestricted as to the subscribers of the P. B. X exchange. If most of the exchanges are to be restricted, the absence of ground on a terminal may be conveniently used to indicate such condition, and the presence of ground may be used to indicate nonrestriction, whereby fewer terminal straps will be needed.

As a register seizes a restrictor, the exchange registered on the register by the calling subscriber is extended to the restrictor which automatically selects the terminal associated with the called exchange, and returns an indication back to the register 150 as to the restricted or nonrestricted nature of the exchange. The register extends a signal over the trunk finder 145 to the utomatic city trunk 115 to indicate to the trunk as to whether the call should be allowed to progress or release.

The manner in which the novel circuit arrangement of the invention is operative to restrict calls to certain exchanges and to permit the extension of other calls will now be set forth hereat, operation of the equipment being exemplified by a description of its response with the dialing of directory number AN1–2459 by a P. B. X subscriber.

*Initiation of call-landing by dialling trunk digit*

The details of the novel restrictor arrangement including the automatic city trunk 115, line circuit 135, guard and allotter circuit 140, trunk finder 145, register circuit 150, restrictor circuit 155, and guard and allotter circuit 160 are set forth in Figures 2–9.

With reference to Figure 2, the illustrated subscriber 100 associated with the private branch exchange 110 has access to the city trunk via one of a plurality of links over level 9, involving the illustrated conductors 200, 201 and 202 which extend to the city trunk such as illustrated trunk 115.

Assuming the illustrated subscriber 100 desires to extend a connection to a party in the city exchange which has the director number AN1–2459, the calling party first effects seizure of an automatic city trunk, such as 115, by lifting the hand piece of his substation set, whereby a loop is completed over conductors 200', 201' to the P. B. X exchange 110 in a conventional manner. The calling party now dials the assigned digit "9" to extend the connection to the trunk circuits, and selection of a city trunk circuit, such as 115, is then automatically accomplished. In the illustrated manner the calling loop is extended over selector level 9 in the P. B. X exchange 110, and conductors 200 and 201 to line relay 210 in the trunk circuit 115.

Line relay 210 operates, and at its contacts 213 lands the call in the city exchange by placing ground on the negative conductor 205. The city exchange operates in a conventional manner to return ground over the positive conductor 204.

Line relay 210 at its contacts 211 completes an operating circuit for the line relay 300 (Fig. 3) of its associated line circuit 135, the operating circuit extending from negative battery over the winding of relay 300, contacts 313, conductor 206, contacts 231 and 211 to ground. The line circuit, such as 135, for each of the trunks basically comprises a line relay, such as 300, and a cut-off relay, such as 312. The initial function of the line circuit with seizure is to control the guard and allotter circuit 140 to select an idle trunk finder, which in turn, seizes a register and restrictor circuit for use during the call. Other functions are described in more detail hereinafter.

Line relay 300 operates, and at its contacts 301 completes an operating circuit for the guard relay 340*a* which is individual to the first group of ten trunks. The guard allotter circuit 140 is somewhat conventional in its arrangement and operation. Briefly, the arrangement includes ten "tens" mark relays 340*a*; 340*j*, each of which is associated with a particular "tens" group; ten "units" marking relays 350*a*–350*j*, each of which is associated with a particular "units" of the tens group; twenty "tens"

auxiliary relays 320a–320j and 330a–330j; a reset relay 380 and miscellaneous control relays 360, 365 and 375.

The trunk circuit seized in the present example is trunk 11, and accordingly, the line circuit 135 associated therewith will operate the first group relay 340a which is associated with line circuits 11—10. If the line circuit is in the second tens group (line circuits 21—20), the second group relay 340b (not shown) operates, etc. In the present example, the line circuit is operative at its contacts 301 to complete an operating circuit extending from positive battery over contacts 302, 301, the winding of relay 340a, contacts 345a . . . 364, 343j . . . 343a, and resistance 328 to negative battery.

Guard relay 340a operates, and at its contacts 344 locks to battery over resistance 328 independent of the original operating circuit, and at its contacts 341 completes an obvious operating circuit for tens auxiliary relays 320a and 330a.

Relays 320a and 330a operate, and at their contacts 321a–321e, 331a–331e extend the marking leads for the first group of ten line circuits associated with lines 11—10 to the units marking guard relays 350a–350j to effect the operation of the particular units marking relay corresponding to the units number of the seized one of the trunk line circuits. Inasmuch as it has been assumed that trunk 11 has been seized, the line relay 300 is operated and the marking lead extending to the first units marking relay 350a is marked with ground to effect operation of the first units marking relay 350a, the circuit extending from ground over contacts 302 in the line circuit for trunk 11, contacts 331a in the guard circuit 140, the winding of the first units marking relay 350a, contacts 355a, 363 and 353j–353a, and resistance 356 to negative battery.

The operated condition of the first relay of the tens group and the first relay of the units group thus indicates that the line circuit 11 is seeking an idle trunk finder.

Assuming the illustrated trunk finder #1 (Fig. 4) to be in the idle and reset condition, its associated allotter relay 440 will be in the operated condition, a circuit therefor extending from negative battery over resistor 442′, contacts 442, the winding of relay 440, conductor 493, contacts 507 (Fig. 5), 502, 513 and 518 to ground. The manner in which the allotter relay for a trunk-register arrangement is thus marked will be discovered in further detail hereinafter.

As the unit guard relay 350a operates, it is effective at its contacts 352a to complete an operating circuit for the start relay 430 of the first trunk finder 145, the circuit extending from negative battery over the winding of relay 430, contacts 443, conductor 395, contacts 352a and 351a to ground.

Start relay 430 associated with trunk finder #1 operates and at its contacts 431a–w prepares the trunk finder for operation and effects seizure of its associated register circuit 150. Specifically, start relay 430, which is under the control of the guard circuit, at its contacts 431w completes a holding circuit for the associated allotter relay 440, the circuit specifically extending from battery over resistor 442′, contacts 442, the winding of relay 440 and contacts 431w to ground.

Start relay 430 at its contacts 431a–431t simultaneously extends the line circuit identification markings on the tens and units relays in the guard circuit 140 to the tens and units relays in the seized trunk finder 145, the circuits thereupon effecting operation of the corresponding ones of the tens and units finder relays. In the present example, relays 400 and 420 (F10 and F1) are operated.

The operating circuit for relay 400 (F10) specifically extends from negative battery over the winding of relay 400, contacts 431a, conductor 389, and contacts 341a and 342a of the operated tens relay 340a in the guard circuit to ground. In like manner, the operating circuit for the units relay 420 (F1) extends from negative battery over the winding of relay 420, contacts 431k, conductor 391 and contacts 351a of the operated one of the guard units relays 350a to ground.

Finder tens and units relays 400 and 420 (F10 and F1) operate, and at their contacts 407 and 424 respectively prepare to lock to ground over 350 ohm resistor 489 and register conductor 494.

Trunk finder tens and units relays 400 and 420 are also effective at their contacts 421, 422, 423 and 401, 402, 403 to extend an operating circuit from the line circuit to the associated register 150, whereby an operating circuit is completed for the line relay 500 thereat, the circuit specifically extending from negative battery over the winding of relay 500, resistor 500′, conductor 491, contacts 422, 402, conductor 206, contacts 231 and 211 to ground. Register line relay 500 is thus connected to respond to the pulsing relay in the automatic trunk circuit 115.

Register line relay 500 operates, and at its contacts 501 completes an operating circuit for the register hold relay 503, the circuit extending from negative battery over the winding of relay 503, contacts 501, 513 and 518 to ground.

Register hold relay 503 operates, and at its contacts 506 prepares an operating circuit for register digit following relay 519, and register counting chain relays 550–578; and at its contacts 508, 509 connects ground to conductor 494 to complete the aforedescribed holding circuit for the trunk finder relays 420 and 400 (F1 and F10 respectively); at its contacts 507 interrupts the ground which has been connected to conductor 493 as holding ground for the allotter relay 440 assigned to the first trunk finder and register unit (the allotter relay 440 being temporarily held by the ground which is applied thereto by the start relay 430 of the trunk finder unit), and at its contacts 509 effects the application of ground to conductor 492 to complete an operating circuit over contacts 423 and 403 for the cut-off relay 312 to battery in the line circuit associated with the seized trunk circuit.

Cut-off relay 312 operates, and at its contacts 313 interrupts the holding circuit for the associated line relay 300 which restores, and at its contacts 302 and 301 interrupts the holding circuit for the operated ones of the guard tens and units marking relays (340a and 350a in the present example) which restore, and in turn effect the restoration of guard identification line extension relays 320, 330 to restore same.

As the operated one of the guard units marking relays (350a in the present example) restores, it is effective at its contacts 351a, 352a to interrupt the holding circuit for the start relay 430 of the seized one of the trunk finders 145 to effect the restoration thereof.

Start relay 430 restores and at its contacts 431w effects the restoration of its associated allotter relay 440 which restores, and in its restored condition, marks the first trunk finder as busy. Relay 440 at its contacts 444 prepares an operating circuit for the start relay (such as illustrated relay 430) associated with the second trunk finder of the group, whereby as a call is received from another subscriber, the second trunk finder unit will be assigned for use in the call.

It is noted that the ground applied to conductor 492 by the register line relay 500 to operate cut-off relay 312 and thereby accomplish restoration of the guard and allotter circuit is also extended over conductor 207 to the hold relay 220 in the automatic city trunk circuit 115, whereby an operating circuit is completed for hold relay 220 which extends from battery over the winding of trunk hold relay 220, contacts 233, conductor 207, contacts 403, 423, conductor 492 and contacts 509 to ground.

Trunk hold relay 220 operates, and at its contacts 224 completes an operating circuit for the trunk relay 240, the circuit extending from negative battery over the lower winding of loop preparing relay 240, contacts 224, contacts 243, and conductor 204 to the ground placed thereon by the city exchange as heretofore described.

Loop preparing relay 240 operates and locks to ground over its make-before-break contacts 243; and at its contacts 242 completes a pulsing loop which is extended over its upper winding and bridges the conductors 204 and 205 extending to the city exchange, the circuit specifically extending from positive conductor 204, the upper winding of relay 240, contacts 242 and 213 to the negative conductor 205.

The aforegoing described operations occur automatically responsive to the dialling of the digit "9" by the calling subscriber. The subscriber then proceeds to dial the seven digits of the directory number of the desired subscriber, the first three of which designate the terminal called office, and the last four of which designate the called party in the terminal called office.

*Dialling first digit of called party directory number*

As the calling party dials the first digit of the directory number (A in the present example), two impulses are transmitted over the loop which extends through the private branch exchange switchboard 110, and over conductors 200 and 201 to the city trunk circuit line relay 210 to effect the pulsing thereof in the conventional manner.

With the receipt of the first break period of the first impulse, the trunk line relay 210 restores, and at its contacts 212 completes an operating circuit to sleeved and slug digit following relay 250 in the trunk, which operates, and remains operated for the period of receipt of the pulses representative of each of the digits. Digit following relay 250 as operated is effective at its contacts 253 to bridge the upper winding of relay 240 to provide an improved pulsing path, and also at its contacts 251 and 252 opens the transmission paths between the private branch exchange and the city exchange.

Trunk line relay 210 follows the incoming impulses, and at its contacts 213 repeats the impulses over the conductors 204 and 205 extending to the city exchange. The city trunk line relay 210 is also effective at its contacts 211 to repeat the impulses over the circuit aforedescribed to line relay 500 in the seized one of the register units (150 in the present example).

With reception of the first break period of the first impulse, register relay 500 restores, and at its contacts 502 completes an operating circuit for the sleeved transfer relay 519, and the first counting chain relay 550. The operating circuit for the transfer relay extends from negative battery over contacts 523, the winding of relay 519, contacts 544, 507, 502, 513 and 518 to ground. The first counting chain relay 550 operates over a circuit which extends from negative battery over contacts 523, the winding of relay 550, contacts 597, 592, 586, 544 and 507, 502, 513 and 518 to ground.

As the subsequent incoming impulses for each digit are received by the register line relay 500, the counting chain relays are advanced in a conventional manner to the relay which is commensurate with the number of impulses received. Each digit received by the counting chain is registered on a preassigned register, the first digit being registered on the first digit register set 600', the second digit being registered on the second digit register set 630', and the third digit on the counting chain itself.

A brief description of the manner in which the counting chain advances with receipt of the various value digits is now set forth, reference being made hereinafter to this description whenever operation of the counting chain is effected.

Briefly, as an energizing circuit is completed to the first counting chain relay 550, the relay operates, and at its contacts 551 extends a circuit in series with the first sequence relay 596, which remains restored by reason of the shunt provided by the operating ground for the first counting chain relay 550. As this ground is removed at the end of the pulse by the reoperation of the register line relay 500, sequence relay 596 operates in series with the first counting chain relay 550, the circuit extending from negative battery over contacts 523, the winding of relay 550, contacts 551, the winding of relay 596, contacts 595 and 509 to ground. Counting chain relay 550 at its contacts 556 is also effective to prepare a circuit for the second counting chain relay 557.

With receipt of the break period of the second impulse, relay 500 restores, and at its contacts 502 completes an operating circuit for the second counting chain relay 557, which operates, and at its contacts 558 prepares a series operating circuit with the second sequence relay 591. As the line relay 500 operates following termination of the break period of the second incoming impulse, the shunt is removed from the prepared operating circuit, and the sequence relay 591 operates in series with the second counting chain relay 557. As the second sequence relay 591 operates, it is effective at its contacts 595 to interrupt the holding circuit for the first counting chain relay 550 and the first sequence relay 596 to effect the restoration thereof.

In a similar manner, line relay 500 restores responsive to receipt of the third impulse to accomplish the operation of the third counting chain relay 564 and the third sequence relay 585, and the release of the second counting chain relay 557 and the second sequence relay 591.

With receipt of the fourth impulse, the line relay 500 effects the operation of the fourth counting chain relay 571 and the first sequence relay 596; and the restoration of the third counting chain relay 564 and the third sequence relay 585.

With receipt of the fifth impulse, the line relay 500 accomplishes operation of the fifth counting chain relay 578 and the second sequence relay 591; and the restoration of the fourth counting chain relay 571 and the first sequence relay 596.

As the sequence relay 596 restores following receipt of the fifth impulse, it is effective at its contacts 547 to complete a series operating circuit for the third sequence relay 585 and the fifth counting chain relay 578, the circuit extending from negative battery over contacts 523, the winding of the fifth counting chain relay 578, contacts 582, the winding of the third sequence relay 585, contacts 547 and 509 to ground.

The third sequence relay 585 operates, and at its contacts 589 interrupts the holding circuit for the second sequence relay 591 to effect the restoration thereof.

With receipt of the sixth impulse of a series, line relay 500 effects operation of the first counting chain relay 550 over a circuit extending from negative battery over contacts 523, the winding of relay 550, contacts 584, 587, 544, 507, 502, 513 and 518 to ground.

Relay 550 operates, and at its contacts 554 completes an operating circuit for the chain recycle relay 532, the circuit extending from negative battery over contacts 523, the winding of relay 532, contacts 537, 554, 590 and 509 to ground. As relay 532 operates, it is effective at its make-before-break contacts 538 to lock to the ground which is imposed upon conductor 492.

Following termination of the break period of the sixth pulse, line relay 500 reoperates to effect removal of the original energizing circuit for the first counting chain relay 550, thus removing the shunt on the first sequence relay 596 to effect the series operation of relay 596 with relay 550, as aforedescribed, and the consequent restoration of the fifth counting chain relay 578, and the third sequence relay 585.

The register line relay 500 is operative in response to the seventh impulse to accomplish operation of the second counting chain relay 557 and the second sequence relay 591, and to effect release of the first counting chain relay 550 and the first sequence relay 596.

With receipt of the eighth impulse, the register line relay 500 accomplishes operation of the third counting chain relay 564 and the third sequence relay 585, and the release of the second counting chain relay 557 and the second sequence relay 591.

With receipt of the ninth impulse, the register line relay 500 accomplishes operation of the fourth counting chain relay 571 and the first sequence relay 596; and the restoration of the third counting chain relay 564, and the third sequence relay 585.

With the receipt of the tenth impulse, the register line relay 500 effects operation of the fifth counting chain relay 578 and the second sequence relay 591, and release of the fourth counting chain relay 571 and the first sequence relay 596. As the first sequence relay 596 restores, the third sequence relay 585 operates in series with the fifth counting chain relay 578 releasing relay 591, as set forth in the description relating to the chain operation with receipt of the fifth impulse.

The counting chain relay which is operated as a result of the receipt of the various digits will be apparent from reference to the aforegoing disclosure.

It will be recalled that the counting chain in the register is utilized to respond to the first three digits dialled and to register the digits on different preassigned register circuits. Reset of the counting chain between digits is accomplished by the register relay 522 which is operated by the various registers as the digit received has been recorded thereon. Register relay 522 at its contacts 523 also effecting restoration of the cycle relay 532 if it has been operated. Inasmuch as the counting chain is utilized as a register for the third digit, the counting chain is not reset following receipt of the third digit, the register relays 524 and 539 being operated at such time to further the restriction or nonrestriction operation, as the case may be.

It will be recalled that the first three digits of the calling party are AN1. Accordingly, as the letter A is dialled, the two impulses representing same advance the counting chain to the second relay 557 and the second sequence relay 591.

As the line relay 500 is held operated following receipt of the last break period of the last impulse of the series, transfer relay 519 restores, and at its contacts 521 effects registration of the digit received on the first digit representation set 600′ (Fig. 6).

The first digit registration set comprises four relay members which are operated in various combinations in accordance with the value of the first digit to be recorded thereon, plus a sequence relay. The following chart is indicative of the relay operated with receipt of the various value digits:

| Digit dialled: | Relays operated |
|---|---|
| 1 | 600, 607 |
| 2 | 600, 611 |
| 3 | 600, 616 |
| 4 | 600, 622 |
| 5 | 600, 607, 611 |
| 6 | 600, 607, 616 |
| 7 | 600, 607, 622 |
| 8 | 600, 611, 616 |
| 9 | 600, 616, 622 |
| 0 | 600, 611, 622 |

In the present example, the first letter of the desired exchange was A (two impulses) and as shown in the chart above, relay 611 is operated to register the receipt of letter A. Specifically, as transfer relay 519 restores, it is effective at its contacts 621 to complete an operating circuit for relay 611 which extends from negative battery over the winding of relay 611, contacts 604, conductor 672, contacts 559, 535, 521, 543 and 509 to ground.

Register relay 611 operates, and at its contacts 615 prepares an operating circuit for associated marking relay 600; and at its contacts 612 completes an operating circuit for the counting chain reset relay 522, the circuit extending from negative battery over the winding of relay 522, conductor 662, contacts 601 and 612 to ground.

Reset relay 522 operates, and at its contacts 523 interrupts the holding circuit for the operated ones of the counting chain relays (557 and 591 in the present example), and removes the initial operating ground from the marking relay 611, whereby the two register relays 611 and 600 will operate in series, relay 600 having been previously shunted by the original operating circuit for relay 611. The operating circuit for the two register relays 600 and 611 now extends from negative battery over the winding of relay 611, contacts 615, the winding of relay 600, conductor 665, and contacts 527 and 509 to ground. Relay 600 operates, and at its contacts 601 interrupts the energizing circuit for the chain reset relay 522 to effect restoration thereof.

With reference to the drawings, relay 600 always operates as a sequence relay following registration of the first digit received on the set 600′, and is operative at its contacts 602′—605′ to transfer the chain pulling circuits to the second digit registration set 630′, whereby the second digit will be registered on the second register.

There is set forth hereat for reference purposes, a description of the manner in which the register relays are operated as the first digit is of different values.

If the first digit is "1", the counting chain is advanced to the first relay 550 and relay 607 is operated over a circuit extending from negative battery over the winding of relay 607, contacts 605, conductor 673, contacts 552, 533, 521, 543 and 509 to ground.

In the event that the first digit dialled by the calling subscriber is "3", the counting chain will be advanced to the third relay 564 of the counting chain, and relay 616 is operated to register the digit on the first digit register set 600′, the operating circuit for relay 616 extending from negative battery over the winding of relay 616, contacts 603, conductor 671, contacts 566, 535, 521, 543 and 509 to ground.

In the event that the first digit dialled by the calling party is "4", the fourth counting chain relay 571 is operated to effect registration of the digit "4" upon the first digit register at 600′, register relay 622 being operated in such event over an operating circuit which extends from negative battery over the winding of relay 622, contacts 602, conductor 670, contacts 573, 535, 521, 543 and 509 to ground.

If the first digit dialled by the calling party is "5", the fifth counting chain relay 578 will be operated, and will effect the registration of digit "5" upon the first digit register 600′ by effecting the operation of relays 607 and 611, the circuit for register relay 607 extending from negative battery over the winding of relay 607, contacts 605, conductor 666, contacts 545, 580, 535, 521, 543 and 509 to ground. The operating circuit for register relay 611 extends from negative battery over the winding of relay 611, contacts 604, conductor 672, contacts 583, 540, 521, 543 and 509 to ground.

If the first digit dialled by the calling subscriber is "6", the first counting chain relay 550 and the cycle relay 532 will be operated as previously set forth herein, and registration of the digit "6" upon the first digit register will be accomplished by effecting the operation of relays 607 and 616. The operating circuit for register relay 607 extends from negative battery over the winding of relay 607, contacts 605, conductor 673, contacts 552, 534, 540, 521, 543 and 509 to ground. Register relay 616 operates over a circuit extending from negative battery over the winding of relay 616, contacts 603, conductor 671, contacts 555, 541, 536, 521, 543 and 509 to ground.

If the first digit dialled by the calling subscriber is "7", the second counting chain relay 557 will be in the operated condition, and registration of the digit "7" upon the first digit register 600′ will be effected by accomplishing the operation of relay 607 and 622. Register relay 607 operates over a circuit extending from negative battery over the winding of relay 607, contact 605, conductor 673, contacts 560, 541, 536, 521, 543 and 509 to ground. Register relay 622 operates over a circuit extending from negative battery over the winding of relay 622, contacts 602, conductor 670, contacts 562, 541, 536, 521, 543 and 509 to ground.

If the first digit dialled by the calling subscriber is "8", the third counting chain relay 564 will be operated in the manner heretofore described, and registration of digit "8" upon the first digit register 600' will be accomplished by effecting operation of relays 611 and 616. Register relay 611 operates over a circuit extending from negative battery over the winding of relay 611, contacts 604, conductor 672, contacts 567, 541, 536, 521, 543 and 509 to ground. Register relay 616 operates over a circuit extending from negative battery over the winding of relay 616, contacts 603, conductor 671, contacts 569, 540, 521, 543 and 509 to ground.

If the first digit dialled by the calling subscriber is "9", the fourth counting chain relay 571 will be operated in the manner heretofore described, and registration of the digit "9" upon the first digit register set 600' will be accomplished by effecting operation of relays 616 and 622. Relay 616 operates over a circuit extending from negative battery over the winding of relay 616, contacts 603, conductor 671, contacts 574, 541, 536, 521, 543 and 509 to ground. Relay 622 operates over a circuit extending from negative battery over the winding of relay 622, contacts 602, conductor 670, contacts 576, 540, 521, 543 and 509 to ground.

If the first digit dialled by the calling subscriber is "0", the fifth counting chain relay 578 will be operated in the manner heretofore described, and the registration of the digit "0" upon the first digit register set 600' will be accomplished by effecting operation of the register relays 611 and 622. Register relay 611 operates over a circuit extending from negative battery over the winding of relay 611, contacts 604, conductor 672, contacts 583, 540, 521, 543 and 509 to ground. Relay 622 operates over a circuit extending from negative battery over the winding of relay 622, contacts 602, conductors 670, 667, contacts 546, 581, 536, 521, 543 and 509 to ground.

It is apparent from the foregoing description that a register comprised of four relays plus a sequence relay for shifting to the next register is operative to register the value of any one of ten digits dialled as the first digit of the called number, the registration of the different digits being accomplished by energization of the register relays in various predetermined combinations.

*Dialling second digit of called party directory number*

As the calling party dials the second digit of the called party number (in the present example, letter N, which on the metropolitan dial is the same as digit 6), the trunk line relay 210 operates in response to the incoming impulses to transmit same over conductors 204, 205 to the city exchange, and simultaneously to the path aforedescribed to register line relay 500, whereby the second digit of the calling party number is registered on the seized register 150 while simultaneously switching equipment in the city exchange is operated to extend the connection toward the calling party.

Register 150 includes a second digit register arrangement 630' which comprises a series of four register relays connected to operate in various combinations, the combination of relays operated with receipt of the digit indicating the value of the digit dialled by the calling subscriber. A sequence relay shifts the incoming circuits to the next register as a digit is registered thereon.

Briefly, as register line relay 500 operates responsive to receipt of the break period of the first impulse of the second digit, it is effective at its contacts 502 to complete an operating circuit for the digit following relay 519, and thereafter effects the advancement of the counting chain one step with each incoming impulse. As taught hereinbefore, with receipt of the sixth impulse, the first counting chain relay 550 and the chain cycle relay 532 will be operated.

As digit following relay 519 restores a brief period after the end of the receipt of the last impulse, registration of the digit indicated by the counting chain (in the present example, digit 6) will be effected upon the second register set 630'. As shown in the chart below, relays 645 and 650 are operated to indicate the receipt of letter "N" (digit "6"). Register relay 645 operates over a circuit extending from negative battery over the winding of relay 645, contacts 636, 605'; conductor 673, contacts 552, 534, 540, 521, 543, and 509 to ground. Register relay 650 operates over a circuit extending from negative battery over the winding of relay 650, contacts 634, 603', conductor 671, contacts 555, 541, 536, 521, 543, and 509 to ground. Register relays 645 and 650 operate, and at their contacts 644 and 653, respectively, extend their operating ground over the winding of register sequence relay 630, conductor 665 and contacts 527 and 509 to ground, the register relay 630 remaining inoperative by reason of the shunt imposed upon the series operating circuit until such time as the original operating circuits for relay 645 and 650 are interrupted.

Register relays 645 and 650 operate and at their contacts 638 and 629 connect ground over contacts 631 and conductor 662 to the winding of reset relay 522 and negative battery to effect the operation thereof.

Reset relay 552 operates and at its contacts 523 interrupts the holding circuit for the operated one of the counting chain relays (in the present example relay 550), sequence relay 596 and cycle relay 532. As the counting chain relay 550 restores, it is effective at its contacts 552 and 553 to interrupt the original energizing circuits for the register relays 645 and 650, whereby the shunt for register sequence relay 630 is removed, and the operation thereof in series with relays 645 and 650 is effected, the circuit extending from negative battery over the windings of relays 645 and 650, contacts 644 and 653, the winding of relay 630, conductor 665 and contacts 527 and 509 to ground. Sequence relay 630 operates, and at its contacts 631 interrupts the energizing circuit for the reset relay 522 to restore same, whereby the counting chain is reconditioned for operation and the registration of the third digit as dialled by the calling subscriber.

Sequence relay 630 associated with the second digit register set 630' is operative whenever a digit is registered on relays 645, 646, 650, 654 or any combinations thereof, and at its contacts 633–636 interrupts the connections between the register counting chain and the second digit register set 630'; and at its contacts 633'–636' prepares the counting chain for connection to the restrictor circuit, the counting chain being operative as a register for the third digit as shown hereinafter.

The manner in which relays 645, 646, 650 and 654 are operated individually and in various combinations to effect the registration of the second digits 1–0 will be apparent from the aforegoing description and the following chart:

REGISTRATION CHART

| Digit dialled: | Relays operated to Register digit value |
|---|---|
| 1 | 645 |
| 2 | 646 |
| 3 | 650 |
| 4 | 654 |
| 5 | 645, 646 |
| 6 | 645, 650 |
| 7 | 645, 654 |
| 8 | 646, 650 |
| 9 | 650, 654 |
| 0 | 646, 654 |

It is apparent from the foregoing description that with receipt of the second digit dialled by the calling party, the value of the digit dialled is registered on the relays of the second digit register 630', and the register thereafter automatically connects the counting chain for use as a register for the third digit received.

*Dialling of third digit of called party directory number*

As the calling party dials the third digit of the called party directory number (in the present Example 1), the trunk line relay 210 effects repetition of the impulses representing the third digit to the city exchange over conductors 204 and 205, and simultaneously effects transmission of the digit to the register 150.

Register line relay 500 responds to the incoming impulses and effects the advancement of the counting chain in accordance with the value of the digit received. Briefly, with receipt of the first break period of the first incoming impulse, the line relay 500 operates digit following relay 519.

Inasmuch as the third digit dialled is "1," the counting chain is advanced to the first relay 550 and sequence relay 596 will be operated in series therewith. As the digit following relay 519 restores following receipt of the third digit, an operating circuit is completed to the restrictor seizing relay 524, the circuit extending from negative battery over the winding of relay 524, contacts 520, conductor 668, contacts 632, conductor 669, the contacts of the operated one of the sequence relays 585, 591 or 596 (in the present example contacts 599 on relay 596), and contacts 509 to ground.

Restrictor seizing relay 524 operates, and at its contacts 528 completes an obvious operating circuit for associate relay 539, which operates and at its contacts 542 prepares a circuit for extending a signal from the terminal to be selected by the restrictor to the signal relay 514 in the register.

Since reset relay 522 is not operated at this time, the counting chain remains energized to indicate the value of the third digit received.

*Seizure of idle restrictor*

Restrictor seizing relay 524 operates, and at its contacts 525 signals the guard circuit that an idle restrictor circuit is needed.

The guard circuit for the restrictor circuits, such as 155, comprises guard relays 955a–955j (Fig. 9), each of the guard relays being associated with a particular one of the register circuits, such as 150. Thus, the first guard relay 955a is associated with the first register set 150, the second guard relay 955b is associated with the second register set (not shown), etc. As the first register desires an allotter, it effects operation of its associated guard relay 955a, the circuit extending from negative battery over resistor 984, the series connected contacts of each of the ten guard relays including 958a–958j, contacts 976, 960a, the winding of relay 955a, conductor 664, contacts 531, 525, 511 and 504 to ground. Description of the manner in which the restrictor circuit is seized necessarily requires that consideration be given to the normal condition of the equipment. Briefly, each restrictor includes an associated busy relay, such as illustrated busy relays 920–925, and an allotter relay, such as illustrated relays 935–930. As a restrictor is idle (as for example, the first restrictor illustrated herewith), its associate relay, such as 920, will be restored, and at its contacts 921 effects operation of its associated allotter relay 935, the operating circuit being completed upon reset (as shown in more detail hereinafter), and at the time extends from battery over resistor 937', contacts 937, the winding of relay 935 and contacts 921 to ground. Reset occurs after each of the restrictors has been used, a set of series contacts 940 to 936 etc. on each of the allotter relays being restored to complete a circuit to shunt the reset relay 980 down, relay 980 having been operated prior thereto over a circuit extending from ground through the winding of relay 980, resistor 985, contacts 958j to 958a, and resistor 984 to battery.

As reset relay 980 restores, it is effective at its contacts 981 to connect operating battery to each of the allotter relays which is in the restored condition, the circuit for the first illustrated allotter relay extending, for example, from negative battery over contacts 981, 936, the winding of relay 935 and contacts 921 to ground. Assuming the allotter is now idle, the associated busy relay 920 will be restored and the allotter relay 935 will reset with restoration of the reset relay 980, and in operating will be effective at its make-before-break contacts 937 to lock up independent of the circuit completed by the reset relay 980. As the idle allotter relays operate, they are effective at their contacts such as 940, 932, etc. to interrupt the shunting circuit for the reset relay 980 to restore same. The manner in which the restrictors are allotted for use as the equipment is used repeatedly is apparent from the foregoing description.

Assuming the first restrictor (the restrictor illustrated in Figures 7 and 8) is idle as the first register of the group 150 (the illustrated register in Figures 5 and 6) seeks access to a restrictor, and assuming that no other register is searching for a restrictor at this time, the allotter relay 935 for the first restrictor will be operated, and as the guard circuit relay 955a is operated by the restrictor seizing relay 524 in the associated register 150, it is effective at its contacts 956a, 957a to complete an operating circuit to the preselected relays 945 and 950 associated with the first restrictor, the circuit extending from negative battery over the winding of relays 950 and 945 in series, contacts 938, 957a, 956a to ground. It is apparent that if the first restrictor were busy, the first allotter relay would be restored and the guard relay 955a would be connected over contacts 939 to the preselective relays of the next idle restrictor.

Assuming the first restrictor is idle, preselection relays 945 and 950 operate, and relay 945 at its contacts 949 completes a holding circuit for its associated allotter relay 935, and at its contacts 948 completes an operating circuit for temporary lock-out relay 975.

Temporary lock out relay 975 operates, and at its contacts 976 holds open the circuit by which the registers engage the guard circuit to provide an interval before selection of another restrictor can occur. Lock out relay 975 is sleeved so that the guard circuit will be held open for an interval after the operating circuit for the guard circuit lock out relay 975 is interrupted at a later period. Preselection relay 945 at its contacts 946a completes an operating circuit for the first register connect relay 700a associated with the first restrictor 155 of the group, the circuit extending from negative battery over the winding of relay 700a, conductor 801, contacts 946a and 956a to ground.

It is apparent from Figures 7, 8 and 9 that each restrictor includes a number of register connect relays 700a–700j which is commensurate with the number of registers in the system. As the preselection relays 945 and 950 for a restrictor operate, they are effective at their contacts 946a–e and 951f–j to connect the markings on the guard relays 955a–955j to the register connect relays 700a–700j. Since the first register 150 is the seizing register in the present example, guard relay 955a is operated, and the ground is found on the marking lead which extends to the first register connect relay 700a. It is apparent from the foregoing description that if the second register were the seizing register, the second guard relay 955b (not shown) would be operated and the marking lead extending to register connect relay 700b (not shown) would be marked by ground. Thus, as the preselection relays 945, 950 operate, the register relay 700b would be operative to connect the first restrictor to the second register, etc.

Continuing now with the assumption that the first register is the seizing register, register connect relay 700a associated with the first register 150 of the group operates, and at its contacts 701–727, connects the first register 150 to the seized one of the restrictors 155. Specifically, relay 700 at its contacts 702–709 extends the marking leads from the contacts of the first digit register set 600′ to the restrictor circuit; at its contacts 710–715 extends the mark leads of the second digit register set 630′ to the restrictor circuit, and at its contacts 716–725 extends the mark leads of the register counting chain to the seized restrictor circuit; at its contacts 726 connects ground over conductor 827 to its associated busy relay 920, which operates and at its contacts 921 interrupts the holding circuit for the allotter relay 935 associated with the first restrictor 155 (which is presently held operated by the preselection relays 945, 950); and at its contacts 727 extends its operating ground over conductor 663 to the winding of register cut-off relay 529 to effect the operation thereof. At its contacts 701, relay 700*a* prepares a circuit to register relay 510.

Register cut-off relay 529 operates, and at its contacts 530 completes a locking circuit for itself and the register connect relay 700, the circuit extending over resistor 531′, contacts 530, 525, 511 and 504 to ground; and at its contacts 531 interrupts the holding circuit for guard circuit relay 955*a* which is associated therewith. Guard circuit relay 955*a* restores, the guard circuit being held unavailable to registers for an interval by the operated condition of the temporary lock-out relay 975.

As guard circuit relay 955*a* restores, it is effective at its contacts 956*a*, 957*a* to interrupt the holding circuit for preselection relays 950 and 945, which restore, and at contacts 946*a* to interrupt the original energizing circuit for the restrictor seizing relay 700*a*, which is now held operated by ground imposed by the seizing register on conductor 663. Preselection relay 945 at its contacts 949 interrupts the holding circuit for the associated allotter relay 935 to effect the restoration thereof; and at its contacts 948 interrupts the holding circuit for the temporary lock-out relay 975, which releases after a time interval which is determined by its sleeve characteristics. At its contacts 976, relay 975 once more makes the guard circuit available to the other registers.

*Restrictor operations*

As noted earlier, each restrictor is arranged to have access to a number of terminals which is consistent with the theoretical number of three digit designations in the telephone system. In a system which uses a metropolitan dial, the finger holes are used for letters as follows:

1—Not used for letter
2—ABC
3—DEF
4—GHI
5—JKL
6—MNO
7—PRS
8—TUV
9—WXY
0—Z and Operator The conventional directory numbering scheme in metropolitan areas (as for example in the city of Detroit) is as follows:

We 2–1371—Directory numbers including extending dialling numbers
0—Access digit to operator for certain towns in Michigan, and for operator assistance
211—Access code to Long Distance Operator
411—Access code to Information
611—Access code to Repair Service On the first digit of directory numbers only the dial finger holes 2–9 are used; that is, numeral 1 does not have a letter associated therewith and is not used in any connection as the first digit. As shown hereinafter, means are provided for preventing a subscriber from by-passing the restrictor equipment by dialling digit "1" first.

In a like manner, only the dial finger holes 2–9 are used in the second digit of the coded directory numbers; however, with numbers such at 211, 411 and 611 which are used for special service, the second digit "1" cannot be blocked entirely, for if it were, the subscribers would be denied access to information service and to repair service. Furthermore, in the arrangement as included in the system as set forth hereinafter, on the third digit, any of the dial finger holes from 1–0 may be used.

Thus, there are eight possibilities for the first digit, nine possibilities for the second digit, and ten for the third digit, and accordingly, the number of combinations of digits which may be used is $8 \times 9 \times 10 = 720$. The restrictor must therefore be operative to select the particular one of 720 terminals which corresponds to the office or number identified by the first three digits dialled by the calling subscriber, and as presented thereby by the seizing register unit. The restricted or nonrestricted condition of an office or number may be indicated by the presence or absence of ground as desired. If a greater number of the exchanges are to be restricted to the private branch exchange subscribers, it is, of course, more practical to use an absence of ground to indicate such condition, and the presence of ground to indicate those exchanges which are not restricted to the subscribers.

Each restrictor unit is basically comprised of four relay groups, one of which groups is operative in accordance with the value of the first digit registered, a second and a third being operated in accordance with the value of the second digit registered, and the fourth group being operative in accordance with the value of the third digit registered.

The first relay group, operative in accordance with the value of the first digit registered on registration set 600′ comprises a group of eight relays 845*a*–845*h* (2S–9S), each of which has access to a group of ninety of the seven hundred and twenty terminals. That is, relay 845*a* (2S) is associated with the first digit "2" and has access to the ninety terminals having the identification numbers 211–290; relays 845*b* (3S) is associated with the first digit "3" and has access to the ninety terminals having the identification numbers 311–390 etc. Thus, as a first digit relay (2S–9S) operates, it selects a predetermined group of ninety terminals.

The second digit which is registered on the second digit registration register set 630′ accomplishes operation of one of three relays, each of which has access to thirty lines of the group of ninety lines selected by the first digit and simultaneously selects one of three relays, each of which has access to ten of the thirty lines selected.

That is, with reference to Figures 7 and 8, it is apparent that each relay, such as 845*a* (2S) having access to ninety lines has three relays 765 (2A), 780 (2B) and 860 (2C) associated therewith. As shown, relay 2A has access to the thirty terminals identified by numerals 211–230, relay TB has access to terminal 241–260, and relay 2C has access to terminals 271–290. The other first digit marking relays 3S–9S each has a similar set of relays associated therewith.

As a first digit relay (2S–9S) operates, it extends operating circuits from the second digit register 630′ to the three relays, such as 2A, 2B, 2C associated therewith, and the relay of the three which is associated with the desired group of thirty lines indicated by the second digit registered is operated. In the present example, terminal 261 is to be selected, and accordingly, relay 2S and 2B will be operated as shown in more detail hereinafter.

Additionally, the value of the second digit as registered on the second digit register set 630′ effects operation of a corresponding one of three relay sets identified as the "147," "278" and "369" relays, and having identification numerals 730, 750; 735, 755; 740, 760 in Figure 7.

Each restrictor has three such relay sets which are common to the nine groups of A, B, C relays, and these relay sets are connected to narrow the field of thirty terminals selected by an operated one of the A, B, C relays to ten terminals. The three common relay sets are identified as 147, 258 and 369 because of the nature of their operation. That is, if the second digit is 1, 4 or 7, the first relay set "147" (730, 750) operates; if the second digit is 2, 5 or 8, the second relay set "258" (735, 755) operates, and if the second digit is 3, 6 or 9, the third relay set "369" (740, 760) operates. Thus, if the second digit is "6," the second relay 2B operates to narrow the field of ninety terminals to thirty terminals and additionally the "369" relay set operates to narrow the field of thirty terminals to ten terminals. While relay sets 147, 258 and 369 have been shown, it should be understood that single high pile-up relays could have been employed instead of sets. It is noted that those sets are to a number of "A," "B," "C" relays, and accordingly the extra expense for "sets" is warranted.

As noted above, the third digit of the number dialled by the calling subscriber is registered upon the counting chain of the register 150, and as the field is narrowed to ten terminals by one of the selecting relay sets "147," "258," "369," the register counting chain relays effect selection of the particular one of the ten terminals selected in accordance with the number registered thereon.

The selected terminal is connected to the register signal relay 514 which operates in accordance with the absence or presence of ground on the selected terminal, and controls the trunk to provide restriction or nonrestriction of the call as indicated by the marking on the terminal.

Summarily then, the first digit selects a group of ninety terminals out of seven hundred and twenty; the second digit selects a group of thirty terminals from the ninety selected, and a group of ten terminals from the thirty selected; and the third digit selects one of the terminals out of the group of ten selected.

The specific manner in which the restrictor operates in effecting selection of the desired terminal in accordance with the digits registered on the first digit set 600′, the second digit set 630′ and the register counting chain will now be set forth.

It will be recalled that in the example of the disclosure, the called party number is AN1–2459, and accordingly, letter "A" (2) has been registered upon the first digit register 600′ by effecting operation of relays 611 and 600; the second digit "N" (6) has been registered on the second digit register 630′ by effecting operation of the register relays 645, 650 and 630; and the third digit "1" has been registered upon the register counting chain by effecting operation of the first counting chain relay 550 and sequence relay 596.

As the register connect relay **700*a* is operated to extend the marking on the first digit registration set 600′** to the first digit marking relays *45a–845h* (2S–9S), the relay corresponding to the number registered upon the first digit register 600′ is operated. Inasmuch as it has been assumed that the letter "A" (digit 2) is registered on the first digit register 600′ (marking relay 611 and sequence relay 600 being in the operated condition), an operating circuit is completed for the first marking relay **845*a* (2S), the circuit specifically extending from negative battery over the winding of relay 845*a*, conductor 802, contacts 702, conductor 680, contacts 625, 619, 613 and 609 to positive battery. Marking relay 845*a* operates, and at its contacts 846*a*–848*a* extends the marking leads output from the second digit register set 630′ to the three relays 765, 780 and 860** (2A, 2B, 2C).

Inasmuch as the second digit of the calling number in the illustrated example is "N" (6), relays 645 and 650 in the second digit register 630′ are in the operated condition, and accordingly an energizing circuit is completed for the second relay 2B (780) which has access to terminals 241–260, the circuit specifically extending from negative battery over the winding of relay 2B (780), conductor 829, contacts **847*a*, conductor 815, contacts 714, conductor 692, contacts 642, 648, 651′ and 657** to ground.

Simultaneously, with the operation of the proper one of the relays 2S–9S, the digit registration on the second digit register 630′ (in the present example digit 6) determines which one of the three tens selecting relay sets "147," "258," "369" is to be operated. Since relays 645 and 650 in the set 630′ are operated to register digit "6," an operating circuit is completed for the relay "369" associated with the sixth tens group. Relay 369 operates over a circuit extending from negative battery over the winding of relays "369," (760, 740), conductor 813, contacts 712, conductor 690, contacts 698′ and 665 to ground.

As a result of the operation of the relays **845*a* (2S), 780 (2B), and 740, 760 ("369") in the restrictor, an operating circuit will be completed from the terminal marked AN1 (261) to the register signal relay 514, the circuit extending from negative battery over the winding of relay 514, contacts 515, 542, 521, 533, 552, conductor 673, contacts 605′, 636′, conductor 694, contacts 716, 761*a* and 789*a* to terminal 261**.

The signal relay 514 in effect tests for the presence or absence of ground. If the presence of ground is detected (the signal for nonrestriction in the illustrated system), register relay 514 will operate, and at its contacts 516 (make-before-break) locks over contacts 504 to ground. It is, of course, obvious that if an absence of ground condition exists at the terminal 261 (the signal for restriction), the signal relay 514 will not operate.

Release relay 510 in the register 150 operates on each call following operation of the restrictor relays independent of the restricted or nonrestricted nature of the call, and independent of the operation or nonoperation of signal relay 514, the operating circuit of relay 510 being completed by the operated one of the A, B, C, relays. In the exemplary call set forth herein, the operating circuit for release relay 510 extends from negative battery over the winding of relay 510, contacts 512, conductor 660, contacts 701, 743 and 793 to ground. Release relay 510 operates, and at its contacts 512′ locks over contacts 504 to ground in an obvious manner; and at its contacts 513 interrupts the holding circuit for the trunk finder, register and restrictor independent of whether the call has been marked as restricted or nonrestricted. If the call has been marked restricted, the release relay 510 is also operative to release the trunk circuit and the calling line finder and selector. If the calling line is equipped for lock-out, it is placed on lock-out; if it is not, it is seized over another link and dial tone is extended thereto.

If the call is a nonrestricted call, the operation of the signal relay 514 signals the trunk via conductor 490 to hold itself and the calling connection prior to release of the register, restrictor, and trunk finder. In such event, the call extending equipment is locked up and the calling party can continue his dialling over circuits which have been seized in the city exchange to obtain the party desired.

*Sequence as result of restriction*

Assuming first that the call was to be restricted, the register upon testing the terminals finds an absence of ground, and accordingly operates to release the equipment and thereby prevent extension of the call through the city exchange. Briefly, it will be recalled that the restrictor was seized following dialling of the third digit by operation of seizing relay 524 in the register, the delay having been effective at its contacts 525 to notify the guard circuit of its need for a restrictor; at its contacts 526, 527 to transfer the holding circuits for the operated ones of the register relays to ground independent of the ground provided by the hold relay 503. The register cut-off relay 529 operated shortly thereafter as the register connect relay 700*a* extended the registration on the various registers to the restrictor equipment, and cut-off relay 529 was effective at its contacts 530 to lock to ground with the register connect relay 700*a*, the circuit extending from negative battery over the winding of relay 700*a*, conductor 663, resistance 531′, contacts 530, 525, 511 and 504 to ground.

Now, the register release relay 510 is operated by the effective one of the A, B, C, relays in the restrictor simultaneously with connection of the selected terminal to the signal relay 514. Relay 510 is effective at its contacts 511 to interrupt the holding circuit for the register cut-off relay 529 and register connect relay 700*a*, and at its contacts 513 to interrupt a point in the energizing circuit for register hold relay 503.

Register cut-off relay 529 and the register connect relay 700*a* release immediately, restrictor relay 700*a* being effective at its contacts 726 to interrupt the holding circuit for restrictor busy relay 920; at its contacts 702 to interrupt the energizing circuit for the operated one of the first digit marking relay (2S); at its contacts 712 interrupts the energizing circuit for the operated one of the tens selecting relays ("369") and at its contacts 714 interrupts the energizing circuit for the operated one of the second digit marking relays (2B), whereby the restrictor 155 is eligible for reset.

Release relay 510 at its contacts 512′ is locked to ground over contacts 504, and accordingly its open contacts 511 prevent reoperation of the first guard circuit relay 955*a* at this time.

After a time interval determined by its slow-to-release characteristics, register relay 503 restores, and at its contacts 504 interrupts the holding circuit for release relay 510, and at its contacts 508, 509 interrupts the holding circuits for restrictor seizing relay 524, the operated one of the counting chain relays (in this example, 550 and 596), and the trunk line cut-off relay 312.

Restrictor seizing relay 524 restores, and at its contacts 526 interrupts the holding circuit for the operated ones of the first and second digit register set 600′ and 630′ (in the present example relays 611, 600, 645, 650, 630), and at its contacts 528 interrupts the holding circuit for register relay 539.

Hold relay 503 in restoring opens contacts 508, 509, interrupting the connection of ground to conductor 494, thereby effecting interruption of the holding circuit for the operated ones of the trunk finder relays (in the present example 400—F10, and 420—F1), to thereby effect restoration of the seized one of the trunk finders. Hold relay 503 in restoring is also effective at contacts 509 in removing ground from conductor 492 to interrupt the holding circuit for the calling selector and line finder in the P. B. X exchange, and to open the circuit for the sleeved and slugged trunk relay 220 which releases after an interval. As the calling selector and line finder and the trunk finder restore, both the trunk line relay 210 and the line relay 500 in the seized register restore.

As trunk line relay 210 restores, it is effective at its contacts 213 to interrupt the loop circuit through the upper winding of the trunk relay 240 to the city exchange to thereby release control by the P. B. X exchange of the city exchange connection, and simultaneously operates to complete an energizing circuit for the trunk relay 250, the circuit specifically extending from negative battery over the winding of relay 250, contacts 225 and 212 to ground. Relay 250 operates, and at its contacts 251 and 252 further opens the transmission circuit to the city exchange.

Register relay 500 in restoring is operative to connect ground to the start lead 493 extending to the allotter relay 442, thus making the trunk finder used in the establishment of the test eligible for reset.

The subsequent release of the trunk relay 200 opens contact 224 to interrupt the holding circuit for the trunk relay 240 to restore same; and at its contacts 225 interrupts the circuit for the trunk relay 250 which restores after an interval to restore the trunk circuit to normal.

The system is now reset.

*Sequence as a result of nonrestriction*

It will be recalled that if the call is not restricted, ground will be found on the terminal associated with the desired exchange, and the register signal relay 514 operates in response thereto to indicate to the trunk that the call may progress to the city exchange.

Specifically, if the selected terminal is grounded (nonrestriction), release relay 510 and signal relay 514 will lock to ground over contacts 504 of hold relay 503. Signal relay 514 as operated is effective at its contacts 517 to extend a signal to the trunk nonrestriction relay 230 to effect the operation thereof, the circuit specifically extending from negative battery over the winding of relay 230, conductor 208, contacts 401, 421, conductor 490 and contacts 517 to ground. Trunk nonrestriction relay 230 operates, and at its contacts 236 completes a holding circuit for itself extending from negative battery over the winding of relay 230, contacts 236, 223, 224 and 243 to ground; at its contact 232 completes a holding circuit for the trunk holding relay 220, the circuit extending from negative battery over the winding of relay 220, contacts 232 and 211 to ground; at its contacts 231 interrupts the holding circuit for the register line relay 500; at its contacts 234 transfers the selector P-wire over make-before-break contacts to ground independent of the register, the circuit extending from ground over contacts 234, 221 and 226′ to the selector P-wire to thereby hold the calling connection through the P. B. X line finder and selector, and at its contacts 233 prevents the connection of ground to conductor 207 and 492 which extends to the trunk line, trunk finder and register equipment.

Register line relay 500 restores, and at its contacts 501 further opens the holding circuit for the associated register hold relay 503 which was opened when relays 510 and 514 operated. Hold relay 503 restores, and at its contacts 504 interrupts the holding circuit for register relays 510, 514; at its contacts 509 interrupts the holding circuit for register relays 524, 539, 550, 596 and trunk cut-off relay 312; and at its contacts 508 opens the holding circuit for trunk-finder relays 400 and 425.

It should be observed in summary that release of the trunk-finder, register, and restrictor is always initiated at this point in the sequence by releasing relay 503 independent of the restricted or nonrestricted nature of the call. If the call is nonrestricted, relay 514 sends a trunk holding signal to the trunk before release of the trunk-finder, register and restrictor is effected.

With the trunk relay 230 operated and the register, restrictor and trunk finding equipment restored, the calling party may now dial the last four digits of the called number into the city exchange, the trunk relay 210 relaying these pulses via contacts 213 to the loop extending to the city exchange. Trunk relays 220 and 250 operate in the manner described heretofore responsive to the receipt of the last four digits of the called number. The equipment in the city exchange operates to select the called party indicated by the digits dialled, and as the called party answers, a talking connection is thereby completed in the conventional manner.

*Release*

The connection is under the control of the calling party. As the calling party restores the hand set to the instrument, the calling line loop is opened to release the trunk relay 210 which restores, and at its contacts 213 opens the loop to the city exchange, and at its contacts 212 completes an operating circuit for the digit following relay 250, and at its contacts 211 interrupts the holding circuit for the holding relay 220.

After an interval of time determined by its operating characteristics, relay 220 restores, and at its contacts 223, 224 interrupts the holding circuit for relays 240, 230 and 250, which restore. Hold relay 220 at its contacts 221 also interrupts the holding ground which has been extended to the selector P-wire 202 to effect the release of the calling P. B. X selector, line finder and calling line circuit.

*Further consideration of restrictor circuit*

It will be recalled that in the restrictor the first digit dialled effects selection of a group of ninety out of seven-hundred and twenty terminals, the second digit effects selection of a group of thirty from the ninety terminals, and a group of ten terminals from the thirty terminals; and the third digit effects selection of one terminal out of the group of ten terminals selected.

As the registers are connected to the restrictor, relays operate in accordance with the value of the first digit dialled and registered on the first digit registration set 600'. In the example set forth hereinbefore, the first digit dialled was A (2), and accordingly, relay 2S was operated to extend circuits to associated relays 765, 780, 860 (2A, 2B, 2C). The particular relays which are operated as a result of the receipt of the one to ten pulses in the first digit of a called number are as follows (the action of the equipment in response to first digit "1" or "0" being further explained hereinafter):

| First Digit Value of Digit | First Digit Register Relays Operated To Register Digit Value | First Digit Restrictor Marking Relays Operated |
|---|---|---|
| 1 | 607 | |
| 2 | 611 | 845a |
| 3 | 616 | 845b |
| 4 | 622 | 845c |
| 5 | 607, 611 | 845d |
| 6 | 607, 616 | 845e |
| 7 | 607, 622 | 845f |
| 8 | 611, 616 | 845g |
| 9 | 616, 622 | 845h |
| 0 | 611, 622 | |

The operating circuits for relays 3S–9S as a result of the first digit are summarized as follows:

DEF—(3) —, 845b (3S), C803, contacts 703, C681, contacts 624, 618', 613, 609 to ground.

GHI—(4) —, 845c (4S), C805, contacts 704, C682, contacts 623, 618, 613 and 609 to ground.

JKL—(5) —, 845d (5S), C806, 705, C683, contacts 614' and 609' to ground.

MNO—(6) —, 845e (6S), C807, contacts 706, C684, contacts 620', 614 and 609' to ground.

PRS—(7) —, relay 845f, (7S), C808, contacts 707, C685, contacts 626', 620, 614 and 609' to ground.

TUV—(8) —, relay 845g, (8S), C809, contacts 708, C686, contacts 619', 613' and 609 to ground.

WXY—(9) —, 845h (9S), C810, contacts 709, C687, contacts 624', 618', 613 and 609 to ground.

The foregoing chart has been included for the purpose of indicating the nature of the operation of the relays in the restrictor responsive to the dialling of any one of the numbers 1 to 0 (or associated letters) as the first digit of the desired exchange, and specifically the manner in which the operation of one of the relays 2S–9S is effected responsive to receipt of the first digit.

It will be recalled that the purpose of the second digit is to select a group of thirty terminals from the ninety terminals selected and a group of ten terminals from the thirty terminals selected. A summary chart appears as follows:

| Value of Second Digit | Second Digit Register Relays Operated To Register Digit Value | Second Digit Restrictor Marking Relays Operated |
|---|---|---|
| 1 | 645 | "147" and one of the relays 2A, 3A . . . 9A. |
| 2 | 646 | "258" and one of the relays 2A, 3A . . . 9A. |
| 3 | 650 | "369" and one of the relays 2A, 3A . . . 9A. |
| 4 | 654 | "147" and one of the relays 2B, 3B . . . 9B. |
| 5 | 645, 646 | "258" and one of the relays 2B, 3B . . . 9B. |
| 6 | 645, 650 | "369" and one of the relays 2B, 3B . . . 9B. |
| 7 | 645, 654 | "147" and one of the relays 2C, 3C . . . 9C. |
| 8 | 646, 650 | "258" and one of the relays 2C, 3C . . . 9C. |
| 9 | 650, 654 | "369" and one of the relays 2C, 3C . . . 9C. |
| 0 | 646, 654 | |

In the exemplary call traced heretofore, it will be recalled that register relays 645 and 650 were operated as a result of the dialling of the second digit 6 (N) by the subscriber and as the register was connected to the restrictor, restrictor relays 2B and "369" were operated to select terminals 241–260 and further terminals 261—260 therefrom.

It is observed from the above table that relay set "147" operates if the second digit is 1, 4 or 7; relays set "258" operates if the second digit is 2, 5 or 8; and relay set "369" operates if the second digit is 3, 6 or 9. Likewise, the A, B, C, relays for each S relay are arranged so that the relay A operates if the second digit is 1, 2 or 3; relay B operates if the second digit is 4, 5 or 6; and relay C operates if the second digit is 7, 8 or 9.

Thus, the following chart may be derived:

| | Relays | | |
|---|---|---|---|
| | 147 | 258 | 369 |
| Relays: | *Digits* | *Digits* | *Digits* |
| 2A | 1 | 2 | 3 |
| 2B | 4 | 5 | 6 |
| 2C | 7 | 8 | 9 |

In the event that digit 1 is dialled as the second digit, register relay 645 will be operated and as the register is connected to the restrictor, an operating circuit is completed for relays 2A and "147":

—, Relays "147," contacts 710, conductor 688, contacts 655", 639, 698, and 665 to ground.

—, 2A, contacts 846a, C814, contacts 713, C691, contacts 640, 647, 651 and 657 to ground.

Relay 2A operates to extend the leads associated with the thirty terminals identified as 211—210, 221—220, 231—230 to the contacts or relays "147," "258" and "269" respectively. Since relay set "147" is the only relay set of the three operated, only terminals 211—210 are extended to the counting chain by relay set "147" at its contacts 751a–751f and 731–733. Each of these terminals is, of course, extended to a different one of the counting chain relays so that as a counting chain relay eventually operates responsive to receipt of the third digit, only one of these leads will be extended to the signal relay 514.

The following chart indicates the manner in which the various terminals are extended to the individual counting chain relays by the "147," "258" and "369" relays, the example below setting forth particularly the manner of operation of relay "147." It should be understood that certain contacts are not shown but are assigned representative numbers.

Terminal 211 is extended over contacts 766*a*, 751*a*, 716, C694, contacts 636′, 605′ and C673 to contacts 552 on the first counting chain relay.

Terminal 212 is extended over contacts 766*b*, 751*b*, contacts 717, conductor 695, contacts 635′, 604′, conductor 672 to contacts 559 of the second counting chain relay.

Terminal 213 is extended over contacts 766*c*, 751*c*, contacts 718, conductor 696, contacts 634′, 603′, conductor 671 and contacts 566 of the third counting chain relay 564.

Terminal 214 is extended over contacts 766*d*, 751*d*, contacts 719, conductor 697, contacts 633′, 602′, and conductor 670 to contacts 573 of the fourth counting chain 571.

Terminal 215 is extended over contacts 766*e*, 751*e*, contacts 720 and conductor 674 to contacts 580 of the fifth counting chain relay.

Terminal 216 is extended over contacts 766*f*, 751*f*, contacts 721, and conductor 675, to contacts 553 of the first counting chain relay.

Terminal 217 is extended over contacts 766*g*, 731, contact 722 and conductor 676 to contacts 561 of the second counting chain relay.

Terminal 218 is extended over contacts 766*h*, contacts 731′, contacts 723 and conductor 677 to contacts 568 of the third counting chain relay.

Terminal 219 is extended over contacts 766*i*, 731″, contacts 724, and conductor 678 to contacts 575 to the fourth counting chain relay.

Terminal 210 is extended over contacts 766*j*, 732, contacts 725, and conductor 679 to contacts 581 of the fifth counting chain relay.

The above chart exemplifies the manner in which a specific ten terminals of thirty terminals are extended to the contacts of the individual relays of the counting chain in accordance with the value of the second digit dialled, the specific digit dialled in such example having been "1." There will now be set forth hereinafter the manner in which ten different terminals are extended to the counting chain as a result of the digits 2–9 being dialled as the second digit of the called number.

Assuming the second digit dialled was 2, register relay 646 of the second registration set 630′ will be operated, and circuits are completed to relays (2A) 765 and "258" as the register is connected to the restrictor.

—, relay 2A, contacts 846*a*, C814, contacts 713, C691, contacts 641, 647′, 651 and 657 to ground.

—, winding of relays "258," contacts 711, C689, contacts 656′ and 665′ to ground.

Relay "258" operates and at its contacts extends the conductors associated with terminals 221—220 to the above identified contacts of the register counting chain.

In the event that the second digit dialled is "3" the register relay 650 of the second digit register 630′ is operated, and operating circuits are completed to relays 2A (765) and "369."

—, relay 2A, contacts 846*a*, C814, contacts 713, C691, contacts 641, 648, 651′ and 657 to ground.

—, relays "369," C813, contacts 712, C690, and contacts 698′ and 665 to ground.

The operation of relay "369" effects extension of the leads associated with terminals 231—230 to the contacts above cited of the register counting chain relays.

In the event that the second digit dialled is "4," relay 654 will be operated in the second digit registration set 630′ and operating circuits are completed for relays 2B (780) and "147."

—, relay 2B (780), C829, contacts 847*a*, C815, contacts 714, C692, contacts 652, 643 and 657′ to ground.

—, relays "147," contacts 710, C688 and contacts 655″ and 629 to ground.

As relays 2B and "147" operate they effect the extension of terminals 241—240 to the above identified contacts of the register counting chain relays.

In the event that the second digit dialled is "5," relays 645 and 646 will be in the operated condition, whereby operating circuits are completed for relays 2B (780) and "258" as the register is connected to the restrictor.

—, relay 2B, C829, contacts 847*a*, C815, 714, C692, and contacts 642, 647′, 651 and 657 to ground.

—, relays "258," contacts 711, C689, and contacts 656′ and 665′ to ground.

As these relays operate, terminals 251—250 are extended to the above identified contacts of the counting chain relays.

In the event that the second digit dialled is "6," relays 645 and 650 in the second digit registration set 630′ will be operated, and as the register is connected to the restrictor, circuits will be completed to relays 2B and "369."

—, relay 2B, C829, contacts 847*a*, C815, contacts 714, C692, contacts 642, 648, 651′ and 657 to ground.

—, relays "369," C813, contacts 712, C690 and contacts 698′ and 665 to ground.

In the event the second digit dialled is "7," relays 645 and 654 will be in the energized condition, and operating circuits will be completed for the relays 2C (860) and "147" as the register is connected to the restrictor.

—, relay 2C, contacts 848*a*, C816, contacts 715, C693, contacts 643′ and 657′ to ground.

—, relays "147," contacts 710, C688 and contacts 655″ and 629 to ground.

As relays "147" and 2C operate, they effect extension of the terminals 271—270 to the above identified contacts of the counting chain relays 550—578.

In the event that the second digit dialled is digit "8," relays 646 and 650 of the second digit register 630′ will be in the operated condition, and an operating circuit will be completed for relays 2C (860) and "258" as the register is connected to the receiver.

—, relay 2C, contacts 848*a*, C816, contacts 715, C693 and contacts 648′, 651′ and 657 to ground;

—, relays "258," contacts 711, C689, 656′ and 665′ to ground.

Relays 2C and "258" operate to extend terminals 281—280 to the above identified contacts of the counting chain relays 550–578.

In the event that the second digit dialled is "9," relays 650 and 654 are in the operated condition, and an operating circuit is completed for relays 2C (860) and "369" as the register is connected to the restrictor.

—, relay 2C, contacts 848*a*, C816, contacts 715, C693 and contacts 652′, 643 and 657′ to ground.

—, relays "369," C813, contacts 712, C690 and contacts 698′ and 665 to ground.

Relays 2C and "369" operate and effect extension of terminals 291—290 to the above identified contacts of counting chain relays.

It is apparent from the foregoing description that terminals 211, 241, 271 . . . 911, 941, 971 are multipled to a common contact set 751*a* on relay "147"; terminals 216, 246, 276 . . . 916, 946 and 976 are multipled to a common contact set 751*f* on relay "147"; terminals 221, 251, 281 . . . 921, 951 and 981 are multipled to a common contact set 756*a* on relay "258," etc. Thus, the operated one of the first digit marking relays 845*a*–845*h* prepares its associated three relays (2A, 2B, 2C) to operate in combination with the "147," "258," "369" relays to switch the corresponding terminals to the contacts of the register counting chain relays 550–578.

*Equipment operated responsive to receipt of third digit*

In the exemplary connection set forth heretofore, it was assumed that the third digit was digit "1," and accordingly terminal 211 was extended to the signal relay 514 of the register 150 by the first counting chain relay 550 as it is operated. If ground was not strapped to the terminal 211, signal relay 514 did not operate and the call was restricted. In the event that the ground was strapped to the terminal 211, signal relay 514 does operate and locks to give non-restriction.

The extension of the terminals to the signal relay by the counting chain will now be set forth in detail, the following chart providing a picture of the relays operated as a result of the various third digits.

| Value of digit: | Third digit register relays operated |
|---|---|
| 1 | 550, 539 |
| 2 | 557, 539 |
| 3 | 564, 539 |
| 4 | 571, 539 |
| 5 | 578, 532, 539 |
| 6 | 550, 532, 539 |
| 7 | 557, 532, 539 |
| 8 | 564, 532, 539 |
| 9 | 571, 532, 539 |
| 0 | 578, 532, 539 |

In the event that the third digit dialled is "1," terminal 211 is extended to the signal relay as follows:

C673, contacts 552, 533, 521, 542, 515 and the winding of signal relay 514 to negative battery.

In the event that the third digit dialled is "2," terminal 212 is extended to the signal relay 514 as follows:

Conductor 672, contacts 559, 535, 521, 542, 515 and relay 514 to negative battery.

If the third digit dialled is "3," terminal 213 is extended to signal relay 514 as follows:

Conductor 671, contacts 566, 535, 521, 542, 515 and relay 514 to negative battery.

In the event the third digit dialled is "4," terminal 214 is extended to signal relay 514 as follows:

Conductor 670, contacts 573, 535, 521, 542 and 515 to signal relay 514 and negative battery.

In the event that the third digit dialled is "5," terminal 215 is extended to signal relay 514 as follows:

Conductor 674, contacts 580, 535, 521, 542, 515 to signal relay 514 and negative battery.

If the third digit dialled is "6," terminal 216 is extended to signal relay 514 as follows:

Conductor 675, contacts 553, 536, 521, 542, 515 and relay 514 to negative battery.

If the third digit dialled is "7," terminal 217 is extended to signal relay 514, as follows:

Conductor 676, contacts 561, 536, 521, 542, 515 and relay 514 to negative battery.

If the third digit dialled is "8," terminal 218 is extended to signal relay 514 as follows:

Conductor 677, contacts 568, 536, 521, 542, 515, and signal relay 514 to negative battery.

If the third digit dialled is "9," terminal 219 is extended to signal relay 514 as follows:

Conductor 678, contacts 575, 536, 521, 542, 515 and signal relay 514 to negative battery.

If the third digit dialled is "0," terminal 210 is extended to the winding of signal relay 514 as follows:

Conductor 679, contacts 581, 536, 521, 542, 515 and signal relay 514 to negative battery.

Summarily, the first digit selects a group of ninety terminals out of seven-hundred and twenty terminals by operating one of the digit marking relays **845*a*–845*h***.

The first digit marking relay which operates extends circuits to each of three relays associated therewith which control thirty terminals each. As, for example, illustrated relays 765 (2A), 780 (2B), 860 (2C).

The second digit results in the operation of one of the three associated relays which has been prepared to thereby narrow the field to thirty terminals. The second digit also results in one of the relay sets "147," "258" and "369" being operated. The appropriate relay of this group operates and narrows the field to ten terminals which are extended to the register counting chain 550–578.

As the third digit is received, the appropriate one of the counting chain relays 550–578 and associated relays 530, 530 operate in such manner that the field is narrowed to a single terminal which is extended to the signal relay 514, which tests for the absence or presence of ground on the terminal, and indicates to the trunk as to whether or not the call should be restricted.

*First digit restriction or non restriction*

It will be noted that the relays in the first digit register set 600′ include contacts which control circuits extending to two terminals labelled "1" and "0," which in effect, correspond to the first digit "1" and the first digit "0." Above each of these leads will be found terminals R and NR which indicate restriction and non-restriction. Theroretically, terminal 1 can be connected to either lead R or NR, and terminal 0 can be connected to either lead R or NR. With reference to the registration chart set forth hereinbefore, it will be seen that if the first digit dialled is "1," relay 607 is operated and a path is thus completed to terminal 1, the path extending from ground over contacts 609′, 614, 620, and 626 to terminal 1.

It is also noted from the same chart that in the event the first digit dialled is "0," relays 611 and 622 are operated and a path is then extended to terminal 0 from ground over contacts 609, 613′, 619, 625′ to terminal 0.

If terminal 1 in the first digit register 600′ is connected to the restriction circuit identified as "R," such arrangement prevents the calling party from dialling the digit 1 of a first selector of a city exchange equipped for absorbing digit 1, and thereafter dialling the call directory number without restriction under circumstances in which the called number should be restricted. Also private branch exchange subscribers can be restricted from dialling the first digit 0 to reach a toll operator, such arrangement being achieved by strapping the terminal 0 marking circuit for the first digit register 600′ to terminal R. If in any installation it is deemed advisable to have the private branch exchange subscribers dial 0 to reach a toll operator, terminal 0 may, of course, be strapped to a non-restriction circuit such as indicated in Figure 6 by the identifying letters NR.

It will be recalled that the first digit registration relays operate as the digit following relay 519 in the register releases following receipt of the first digit. Thus, if the first digit dialled is "1" or "0," as the corresponding first digit registration relay or relays operate with the release of relay 519, the nature of the connection of terminal "1" and "0" will determine the manner of operation of the release relay 510.

Assuming first that terminal "1" or "0" is connected to terminal R, the register relays in their operation in the manner above described extend ground over conductor 660 and contacts 512 to the winding of relay 510 and battery to effect the operation thereof. Relay 510 operates, and at its contacts 512′ locks over contacts 504 to ground. As register relay 522 operates as a result of the registration on the first digit register set 600′ of the digit received, the operated one of the counting chain relays, sequence relays and relay 532, if operated, are restored.

The first digit register relay 600 then operates in series with the operated one or ones of the register relays and effects the restoration of the register relay 522. Inasmuch as restrictor seizing relay 524 will not have been operated, a restrictor will not have been seized, and also register relay 539 will not have been operated, and the path to signal relay 514 will be interrupted.

As release relay 510 operates, it is effective at its contacts 513 to interrupt the energizing circuit for the hold relay 503 which restores after an interval determined by its slow-to-release characteristics, and at its contacts 508, 509 removes the holding ground from conductors 492 and 494, and interrupts the holding circuit for the release relay 510. The trunk finder, trunk, and calling P. B. X line-finder and selector release in the manner heretofore described. As the trunk finder restores it interrupts the holding circuit for the line relay 500, which restores and at its contacts 501 interrupts the energizing circuit for hold relay 503 prior to the restoration or release of relay 510, whereby reoperation of hold relay 503 is prevented. With register relays 500, 503 and 510 restored, ground is connected to the conductor 493 and extended to the associated allotter relay such as 440 whereby such relay is made eligible for reset.

Assuming now that terminal "0" or "1" is connected to lead NR, signal relay 514 operates as the associated relay or relays in the first digit register set 600' operate, the ground on the terminal "0" or "1" being applied over conductors 661, contacts 515, to the winding of signal relay 514 and ground. Relay 514 operates in such event, instead of release relay 510, and at its contacts 517 connects ground to conductor 490 which operates the trunk relay 230, as described hereinbefore, to hold the trunk and the established connection from the P. B. X exchange to the icty exchange. If the first digit is "0," the call is usually routed to a toll operator at the city exhcange. If the first digit is "1," in some systems the non-restriction afforded thereby would permit calls to 112 for information; 113 for the repair clerk, etc. As no subscriber numbers in such a system would begin with "1," any nonexistent numbers dialled beginning with "1" would result in a stymie. Similarly, by arranging circuits to contacts of relays 607–622, any first digit could be given restricted or non-restricted service.

*Second digit restriction or non-restriction*

In a somewhat similar manner, two terminals labelled "1" and "0" corresponding to the second digit "1" and "0" are associated with the second digit registration set 630'.

Theoretically, terminal 1 can be connected either to conductor R or NR and terminal "0" can be connected either to conductor R or NR.

Terminal 1 of the second digit register circuit 630' may be connected to either the restriction or the non-restriction circuits. If the number 211 is to be restricted, restriction may be obtained by leaving terminal 211 without ground. In the event non-restriction is desired on dialling 411 and 611, such arrangement can be provided by strapping ground to terminals 411 and 611. In installations in which the second digit 1 is not used for any purpose, terminal 1 may be strapped to terminal R for restriction. In the event that the second digit 0 is not used for any purpose, terminal 0 associated with the second digit register circuit 630' can also be strapped to a restriction circuit such as labelled at R.

In the registration chart it will be seen that if the second digit dialled is "1," relay 645 of the relay set 630' will be operated, and a path will be completed to terminal 1 from ground over contacts 665, 698, 639, 655' to terminal 1.

Likewise, if the second digit dialled is "0," register relays 646 and 654 will be operated and a path will be completed from ground over contacts 665', 656'' to terminal "0."

It should be recalled that the appropriate relays of the second digit registration set 630' operate as the register digit following relay 519 restores following receipt of the second digit. Accordingly, if the digit "1" or "0" is dialled, as the second digit registration relay or relays operate upon the release of digit following relay 519, the operation of the register is dependent upon whether the terminals are connected to conductors R or NR. If terminal "1" or "0" is connected to terminal R, ground placed on the conductor by the second digit register set 630' will be extended over conductor 660 to the winding of release relay 510 and battery, whereby release relay 510 operates and locks over contacts 512' and 504 to ground. The operation of the second digit registration relay or relays effects the operation of register relay 522, which releases the operated ones of the counting and sequence relays, whereupon relay 630 operates in series with the operated one or ones of the register relays in the set 630'. Relay 630 in operating restores register relay 522.

As a result of the foregoing operation, restrictor seizing relay 524 will not have been operated, and the restrictor will not have been seized. Further, relay 539 will not have been operated, and the path to the signal relay 514 will not have been completed, and accordingly the call will be restricted. The operation of release relay 510 effects release of the connection as hereinbefore described.

In the event that the terminal "1" to "0" associated with the second digit register set 630' is connected to terminal NR, the signal relay 514 will be operated as the ground is connected to terminal NR and extended over conductor 661 and contacts 515 to relay 514 and battery. As signal relay 514 operates and locks instead of relay 510, it is effective at its contacts 517 to connect ground to conductor 490, which effects operation of the trunk hold relay 230 in the manner heretofore described. Trunk relay 230 accomplished holding of the trunk and the establishment of a connection from the P. B. X exchange to the city exchange. Inasmuch as the second digit "0" is rarely used (if at all) in connection with a metropolitan dial, conductor 0 will invariably be connected to conductor R. Also, if 211 is used for long distance toll operator, 411 for information and 611 for repair service, general blocking of second digit "1" would block access to 411 and 611. Accordingly, terminal 1 will in most instances be left unconnected. Normally, ground will not be strapped to terminal 211, whereby such number will be restricted, but will not be strapped to terminals 411 and 611 to render same non-restricted.

*Operator access to automatic city trunks*

The drawings indicate access by the attendant cabinet in the P. B. X to automatic city trunks by dialling "9" as would be accomplished by any P. B. X party. In this manner (without additional provision in the trunk circuit), the attendant has the same conditions of restriction and non-restriction as any P. B. X party. With additional provision, the attendant could be given nonrestricted service over the automatic city trunks when seizing them automatically. This might consist in operating an additional relay in the trunk circuit by a signal over the attendant P-wire, which relay would in turn operate trunk relay 230.

In the event the attendant obtains access to the automatic city trunks by means of jacks, provision could be made whereby the plugging of the plug into any trunk jack causes contacts on the trunk jack to place ground on conductor 490, whereby relay 230 operates to give non-restricted service regardless of the digits dialled. With trunk relay 230 operated, the landing of a call in the trunk would not operate the associated line relay in the trunk finder, and the register and restrictor would not be seized.

While there has been described what is regarded to be preferred embodiments of the invention, it will be apparent that various changes, rearrangements and modifications may be made therein without departing from the scope of the invention as defined by the appended claims.

What is claimed is:

1. In an automatic telephone system including a private branch exchange having a plurality of subscribers, means in the private branch exchange for transmitting call routing digits for extending calls to subscribers in different exchanges, and restrictor means at the private branch exchange including counting means operative to count the number of impulses in certain of the call routing digits as transmitted, a plurality of register circuits, each of which is assigned to register a given digit in the sequence, means for transmitting the value of each digit to its associated register as counted, and means controlled by said register and restrictor means to block calls which are being extended by the subscribers toward predetermined ones of said exchanges.

2. In an automatic telephone system including a private branch exchange having a plurality of subscribers, means including automatic trunking means associated with the private branch exchange for transmitting call routing digits to effect the selective extension of calls to the subscribers of other exchanges, and restrictor means at the private branch exchange including identification means having terminal positions for marking the different exchanges as available and unavailable to the exchange subscribers, means operative to select the position on the identification means for the exchange indicated by the call routing digits transmitted, and means operative to block calls at the trunks which are attempted by the subscribers to the predetermined ones of the exchanges which are marked at the selected positions on said identification means as unavailable to the private branch exchange subscribers.

3. In an automatic telephone system including a private branch exchange having a plurality of subscribers, means in the exchange for transmitting call routing numbers to effect the extension of connections to subscribers in the different exchanges, identification means having terminal positions for each of a number of the exchanges including means at each position for marking its associated exchange as available and alternatively as unavailable to the subscribers of the private branch exchange, and restrictor means at the private branch exchange including means operative responsive to receipt of the call routing numbers as transmitted by a calling subscriber to select the associated terminal position on the identification means, and means operatively controlled thereby for effecting extension and restriction of the connection in accordance with the markings at the associated position on said identification means.

4. In an automatic telephone system including a number of exchanges, a plurality of subscribers in each exchange, means in at least one exchange for transmitting call routing digits for extending calls to subscribers of other exchanges including a set of trunk circuits connected for seizure at said one exchange, a plurality of trunk finders, a plurality of register circuits, means operative to connect an idle trunk finder and an idle register circuit to a trunk responsive to seizure thereof by a calling subscriber in the initiation of a call to another exchange, means in the register circuit operative to register certain of the call routing digits as transmitted, at least one restrictor circuit including means for marking exchanges having certain digit routing numbers as not available to the subscribers of said one exchange, means for connecting said restrictor circuit to a register responsive to registration of call routing digits thereupon, and means operative to block the calls which are indicated by the registered digits as connections for the exchanges designated on said marking means as unavailable to the subscribers of said one exchange.

5. An automatic telephone system as set forth in claim 4 which includes means in said register circuits for releasing the seized trunk, trunk finder, register circuit and restrictor circuit following connection of the restrictor circuit to the register circuit.

6. An automatic telephone system as set forth in claim 4 which includes a group of register circuits and a group of restrictor circuits which is less in number than said register circuits, and means for connecting said restrictor circuits for common use by the register circuits.

7. An arrangement as set forth in claim 4 in which said one exchange includes an operators position which is connected for seizure by the subscribers thereof, and means connected for seizure by the operators position for extending calls to the exchanges which are marked as unavailable to the subscribers of the exchange as extended over said trunk circuits.

8. An automatic telephone system as set forth in claim 4 which includes an operators position which is connected for seizure by the subscribers of the exchange, means at the operators position for extending a connection to the exchanges over said trunk equipment which is marked as unavailable to the subscribers of said one exchange, and a second set of trunk circuits in said exchange connected for seizure by the operators position for extending calls to the available and the unavailable ones of said exchanges.

9. In an automatic telephone system including a number of exchanges, a plurality of subscribers in each exchange, means in at least one exchange for transmitting call routing digits for extending calls to subscribers of other exchanges including trunk means connected for seizure at said one exchange, a plurality of trunk finder switches, a plurality of register circuits, means operative to connect an idle trunk finder and an idle register circuit to a trunk responsive to seizure thereof by a calling subscriber in the initiation of a call to another exchange, means in the register operative to register a given number of the call routing digits for the desired exchange as transmitted, a plurality of restrictor circuits each of which includes means for marking certain exchanges as unavailable to the subscribers of said one exchange, means for connecting a restrictor circuit to a register responsive to registration of the call routing digits upon the register, and means in the register operative to block calls which are initiated by said subscribers to certain of the unavailable exchanges prior to registration of said given number of call routing digits.

10. In an automatic telephone system including a number of exchanges, a plurality of subscribers in each exchange, means in at least one exchange for transmitting call routing numbers for extending calls to subscribers of other exchanges including a plurality of trunk circuits connected for seizure at said one exchange, a trunk finder circuit, a register circuit, means operative to connect the trunk finder and the register circuits to a trunk circuit responsive to seizure thereof by a calling subscriber in the initiation of a call to another exchange, means in the register circuit operative to register a portion of the call routing number as transmitter, a restrictor circuit including means for marking certain exchanges as unavailable to the subscribers of said one exchange, means for connecting the restrictor circuit to a register responsive to registration of said certain call routing digits on the register, and means operative to block certain calls which are being initiated by said subscribers prior to registration of the complete set of call routing digits which is normally registered on the register.

11. In an automatic telephone system, a plurality of exchanges, a plurality of subscribers in each exchange, means available to the subscribers in each exchange for transmitting call routing designators to effect the extension of connections to the subscribers of other exchanges including trunk means, a plurality of trunk finders and register circuits, allotter and guard means operative to control a trunk finder to connect a register circuit to a trunk with initiation of a call by a subscriber; a plurality of restrictor circuits, each of said restrictor circuits including identification means for registering thereon the offices which are to be unavailable to the subscribers of said one exchange and the offices which are available to the subscribers of said one exchange, means for registering on the seized register circuit the call routing digits as dialled, means for releasing said trunk to effect blocking of the call whenever the office represented by the registered call routing digits is marked on said identification means as an available office, and means for controlling said trunk to further extend the call whenever the registered call routing digits represent an office which is marked on said identification means as an available office.

12. An arrangement as set forth in claim 11 in which said register circuit includes means operative to block the call in the event that the first digit dialled is of a predetermined value.

13. An arrangement as set forth in claim 11 in which said register includes means for restricting the extension of the call in the event that the second digit dialled is of a predetermined value.

14. An arrangement as set forth in claim 11 in which the register and restrictor circuits include means for premarking certain of the first digit designators as blocking digits, means for premarking certain second digit designators as blocking digits, and means for marking certain combinations of the first three digits as blocking combinations and means for blocking the extension of the connection in the event that the first digit received is a blocking digit, in the event that second digit received is a blocking digit, and in the event that the combination of digits received is a blocking combination.

15. An arrangement as set forth in claim 11 in which each of said trunks include a trunk nonrestriction relay for conditioning the trunk to effect extension of a call responsive to receipt of a predetermined signal, means in said register circuit for operatively controlling the restrictor to select the identification means for the call routing designator with the extension of each call, and means in the register operative to transmit said predetermined signal to said trunk nonrestriction relay whenever the office represented by the call routing designator registered is marked on the identification means as an available office.

16. In an automatic telephone system including a plurality of exchanges, each of which has a plurality of subscribers, means in said exchanges for transmitting call routing numbers to operatively control extension of connections to the subscribers of other exchanges, register means in at least one of said exchanges for recording a certain number of the digits of each call routing number transmitted, restrictor means in said one exchange including a register board having a representative terminal for each exchange, and means for marking the terminals for a certain group of exchanges thereon as unavailable to the subscribers of said one exchange, and the terminals for others of the exchanges as available to the subscribers of said one exchange, means in the register for simultaneously transmitting the plurality of digits recorded on the register means to said restrictor means said restrictor means being operatively responsive thereto to select the marking indication for the particular exchange which corresponds to the digits registered, and means for extending a signal representative of the particular markings for the exchange back to the seizing register.

17. An arrangement as set forth in claim 16 in which said register means includes a counting chain operative to advance in accordance with the number of impulses in each of the call routing digits transmitted, a first register for recording the first digit as counted by said counting chain, a second digit register for recording the second digit as counted by said counting chain, and means operative following registration of the first and second digits on said first and second register to connect said counting chain as a register for the incoming third digit.

18. An arrangement as set forth in claim 16 in which three exchange designator digits are registered for each call, and in which said restrictor means includes means for selecting the terminal indicated by the registered digits comprising a first relay set which is operative to select a first group of ninety terminals in accordance with the value of the first digit recorded, a second relay set which is operative in accordance with the value of the second digit recorded to select thirty terminals from the ninety terminals selected, a third relay set which is also operative in accordance with the value of the second digit registered to select ten terminals from the thirty terminals selected, and means operative in accordance with the value of the third digit registered to select the terminal desired.

19. An arrangement as set forth in claim 16 in which said register means include a plurality of registers, each of said registers being assigned to register a particular digit of each set of digits received and comprising a series of four relays operative singly and in combination to register the digits having values of 1–4, and a sequence relay operative following registration of a digit upon its associate register to prepare a successive one of the registers for use in registering the value of the subsequent incoming digit.

20. In an automatic telephone system having a plurality of circuit paths which are pre-divided into groups for selection purposes, each of said groups being divided into subgroups, a signal input means over which signals indicating the path to be selected are provided, a first circuit selection means operative responsive to receipt of an incoming digit by said signal input means to select the one of said groups which corresponds to the value of the digit received, and a second circuit selection means operative responsive to receipt of the same digit by said signal input means to select one of the subgroups from the selected group in accordance with the value of said incoming digit.

21. In an automatic telephone system having a plurality of circuit paths which are pre-divided into groups for selection purposes, each of which groups is in turn divided into subgroups, signal input means over which digit representing signals indicating the path to be selected are received, a first circuit selection means comprising a number of relay means operative responsive to receipt of a digit representing impulse set by said signal input means to select a group of circuit paths indicated thereby, and a second circuit selection means comprising a number of relay means of like number as said first selection means operative responsive to the receipt by signal input means of the same digit representing impulse set to select one of the subgroups of the group selected by the first selection means which is consistent with the number of impulses in said incoming impulse set.

22. In an automatic telephone system having a plurality of terminals which are divided into a given number of groups, each of which groups is divided into a like number of subgroups, signal input means over which different call routing digits are received, a first circuit selection means comprising a relay member for each one of said groups, each of which relays is operative responsive to receipt by said signal input means of a call routing digit assigned to its associated group to effect the selection thereof, and a second circuit selection means including relays common to the groups of said first selection means and equal in number to the number of subgroups in the groups of said first selection means, and operative responsive to receipt of the same digit by said signal input means to select the subgroup of the selected group which is indicated by the value of the incoming digit.

23. In an automatic telephone system having a plurality of terminals which are divided into three groups, each of which groups is divided into three subgroups, signal input means over which digit representing signals indicating the desired terminal are received, a first circuit selection means comprising a group of three relays, each relay being individual to a preassigned one of the groups and being operative responsive to receipt by said signal input means of a digit representing impulse set assigned to its associated group to effect the selection thereof, a second circuit selection means including three relays, each of which is individual to one subgroup of each group, and means operatively controlled by said signal input means responsive to receipt of the same digit impulse set to control the relays of the second means to select the subgroup of the selected group as indicated by the number of impulses in the incoming digit set.

24. In an automatic telephone system having ninety terminal positions, means for dividing said ninety positions into three groups of thirty each, each of said groups of thirty being divided into three subgroups of ten terminal positions each, signal input means over which call routing digits indicating the desired terminal are received, a first selection means comprising a relay member for each group operative responsive to receipt by said signal input means of a call routing digit assigned to its associated group to effect selection thereof, a second selection means comprising three relays, each of which is assigned to select a particular tens subgroup of each group of thirty, and means for operating said second selection means responsive to the receipt of the same digit by said signal input means to select the subgroup of ten terminal positions from the selected group of thirty terminal positions as indicated by the value of the incoming digit.

25. An arrangement as set forth in claim 24 in which the first and second selection means are operative responsive to receipt by said signal input means of the tens digit to select the desired terminal position, the first selection means being operative to select the thirty terminal positions which include the desired ten terminal positions, and the second selection means being operative to select the desired ten terminal positions from the selected thirty terminal positions.

26. An automatic telephone system as set forth in claim 24 in which said first selection means comprises three relays, the first of which relays is connected to select terminals positions 1–30, the second of which is connected to select terminal positions 31–60, and the third of which is connected to select terminal positions 61–90, and in which said second selection means comprises three relays, each of which has available to it a particular group of ten terminal positions of each thirty, the first relay of the second means being connected to select the first group of ten in each group of thirty, the second relay being connected to select the second group of ten in each group of thirty, and the third relay being connected to select the third group of ten relays in each thirty.

27. In an automatic telephone system, a plurality of terminal sets, each of the sets being divided into groups, and each of the groups being divided into subgroups, signalling means for providing different signals indicative of the terminal set to be selected responsive to receipt of successive call routing digits, a first selection means operative responsive to receipt of a first call routing digit by said signalling means to effect the selection of the particular set of terminals indicated thereby, a second selection means operative responsive to receipt of the subsequent call routing digit by said signalling means to select the group of terminals from the selected set in accordance with the value of the second digit, and a third selection means also operative responsive to receipt of the second digit by said signalling means to select the subgroup from the selected group which is indicated by the value of the second incoming digit.

28. An automatic telephone system as set forth in claim 27 in which said third selection means comprises a set of relays which is common to each selection means of the second selection means.

29. In an automatic telephone system, a plurality of sets of terminals, each of which sets is divided into a given number of groups, each of which groups is divided into a given number of subgroups; signal input means over which digit representing signals indicating the desired terminal are received, a first selection switching arrangement comprising a number of set selection relay members which is consistent with the number of sets in the arrangement, each relay being individual to its own set; means for operating the relay for a given set responsive to receipt of the call routing digit assigned thereto as the first digit of a three digit series; a second selection switching arrangement comprising a given number of group selecting relays which is consistent with the number of groups in each set, each relay of the second selection arrangement being individual to its own group; means for operating a group relay responsive to receipt by said signal input means of the call routing digit assigned to its associated group as the second digit of a three digit series; a third selection switching arrangement comprising a number of subgroup selecting relays which is consistent with the number of subgroups in each group; means for connecting the subgroup relays common to the relays for each of said groups for said second and third selection switching arrangements; and means for effecting operation of one of said common relays responsive to receipt of the second digit, the common relay operated being determined by the value of the second digit.

30. An automatic telephone system as set forth in claim 29 which includes eight terminal sets, each of which includes a group of ninety terminals, and in which the first incoming digit of a routing digit effects operation of the corresponding set selection relay to accomplish selection of the indicated ninety terminal set, and in which the second routing digit effects operation of the corresponding group relay to effect selection of a group of thirty terminals from the ninety which includes the ten lines indicated by the second digit, and simultaneously effects operation of the subgroup selecting relay associated with the desired subgroup to effect selection of the desired ten terminals from the group of thirty terminals selected.

31. In an automatic telephone system having a plurality of sets of terminals, each of which sets is divided into groups and subgroups, signalling means for providing signals indicative of the terminal to be selected as indicated by each digit representing impulse set of a three digit series, means for selecting a set of terminals from a number of terminal sets responsive to receipt by signalling means of the first digit of a three digit series, means for selecting a group of terminals from the set selected responsive to receipt by signalling means of the second digit of the series, means for selecting a subgroup of terminals from the group selected also operative in response to receipt by said signalling means of the second digit by said signalling means, and means for selecting the desired terminal from the subgroup selected responsive to receipt of the third digit by said signalling means.

References Cited in the file of this patent

UNITED STATES PATENTS

| | | |
|---|---|---|
| 1,472,469 | Goodrum | Oct. 30, 1923 |
| 2,039,668 | Stokely | May 5, 1936 |

UNITED STATES PATENT OFFICE
CERTIFICATE OF CORRECTION

Patent No. 2,871,301 January 27, 1959

Clarence C. Crow et al.

It is hereby certified that error appears in the printed specification of the above numbered patent requiring correction and that the said Letters Patent should read as corrected below.

Column 30, line 63, for "transmitter" read -- transmitted --; column 32, line 26, for "1-4" read -- 1-0 --; line 55, before "signal" insert -- said --.

Signed and sealed this 2nd day of June 1959.

(SEAL)
Attest:

KARL H. AXLINE
Attesting Officer

ROBERT C. WATSON
Commissioner of Patents